(12) United States Patent
Kidd et al.

(10) Patent No.: US 11,853,440 B1
(45) Date of Patent: Dec. 26, 2023

(54) SYSTEMS AND METHODS FOR DETECTING INTERCEPTION DEVICES

(71) Applicant: Capital One Services, LLC, McLean, VA (US)

(72) Inventors: Michael James Kidd, Litchfield, NH (US); Stephen Young, Keswick, VA (US); Charles Lawson, Ostrander, OH (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 18/153,315

(22) Filed: Jan. 11, 2023

(51) Int. Cl.
*G06F 21/62* (2013.01)
*G06F 21/31* (2013.01)

(52) U.S. Cl.
CPC .......... *G06F 21/6209* (2013.01); *G06F 21/31* (2013.01); *G06F 2221/2151* (2013.01)

(58) Field of Classification Search
None
See application file for complete search history.

(56) References Cited

U.S. PATENT DOCUMENTS

| | | | |
|---|---|---|---|
| 9,892,293 B1* | 2/2018 | Wade | G06F 21/86 |
| 11,132,875 B1* | 9/2021 | Wang | G01R 31/001 |
| 11,645,427 B2* | 5/2023 | Young | G06Q 20/202 |
| | | | 713/194 |
| 2010/0287083 A1* | 11/2010 | Blythe | G06Q 40/02 |
| | | | 705/35 |
| 2015/0213428 A1* | 7/2015 | Hodges | H04K 3/822 |
| | | | 705/18 |
| 2016/0142174 A1* | 5/2016 | Fine | H04W 12/122 |
| | | | 455/1 |
| 2018/0240103 A1* | 8/2018 | Rezayee | G07F 7/0873 |
| 2018/0261051 A1* | 9/2018 | Ooi | G07F 19/2055 |
| 2019/0207953 A1* | 7/2019 | Klawe | G07F 7/088 |
| 2022/0028228 A1* | 1/2022 | Johnson | G06Q 20/204 |
| 2022/0180712 A1* | 6/2022 | Belshaw | G07F 7/088 |
| 2022/0321592 A1* | 10/2022 | Singh | G07F 19/2055 |
| 2023/0042425 A1* | 2/2023 | Singh | G06Q 20/1085 |

\* cited by examiner

*Primary Examiner* — James R Turchen
(74) *Attorney, Agent, or Firm* — Perkins Coie LLP

(57) ABSTRACT

Systems and methods for detecting interception devices. In some aspects, the system causes transmission of a first detection signal. Based on receiving a first response signal, the system determines a first probability of detection of a first interception device. Based on the first probability of detection, the system transmits a first command to deactivate a user authentication interface. The system may cause transmission of a second detection signal and determine a second probability of detection of a second interception device. In response to the second probability, the system may transmit a second command to reactivate the user authentication interface.

18 Claims, 6 Drawing Sheets

SYSTEMS AND METHODS FOR DETECTING INTERCEPTION DEVICES

SUMMARY

Maintaining data security continues to be a crucial part of identity authentication systems. For example, token authentication devices, such as passport readers, public transportation token gates, or other user authentication interfaces, may be increasingly susceptible to interference or interception of secure information (e.g., identification documents or public transport tokens) by malicious actors, such as by skimming devices. Information transmitted by or stored on authentication tokens may include sensitive user data, such as identity data, biometric data, medical data, or other user-associated information that is unsafe in the wrong hands. As such, in order to prevent security breaches related to interception or extraction of authentication credentials or related information, conventional authentication systems may include detectors that may identify credential interception devices and may take the corresponding authentication system out of service while enabling an investigation into the presence of the credential interception device.

However, such conventional systems may suffer from high rates of false positive identification of credential interception devices. For example, in situations where a presumed credential interception device is detected but unconfirmed, a conventional system may indefinitely disable authentication of further tokens until confirmation of the credential interception device is achieved. The user authentication interface may require subsequent manual checks or repairs to confirm and/or cure the presence of any credential interception devices. In situations where the detection was inaccurate (e.g., in the case of a transient signal due to noise or innocuous objects in the vicinity of the user authentication interface), a conventional system may be liable to cause significant downtime due to these false positive detection events. Additionally, conventional systems may not be adaptive to novel or changing interception methods or techniques, as they are pre-programmed to handle only preexisting or previously known credential interception devices or mechanisms. For example, a conventional system may be ineffective towards credential interception devices that are able to adapt to any detection or security mechanisms, such as through sending interference signals at varying frequencies for the purpose of circumventing detection.

In order to overcome the technical deficiencies in conventional mechanisms for detecting credential interception devices for user authentication interfaces, methods and systems are described herein for novel uses and/or improvements to the security of user authentication interfaces. As one example, methods and systems are described herein for detecting and disrupting devices designed to intercept information within authentication tokens provided by users. For example, disclosed systems may detect skimming devices designed to intercept biometric information stored on passports on electronic passport gates, in a manner that prevents circumvention and reduces the likelihood of false positive detections.

In order to reduce the likelihood of false positives and improve the resilience of authentication interfaces against adaptive interception devices, the system may cause transmission of a detection signal and analyze a resulting response signal, such as through a detection transceiver. For example, the system may adapt to the received signal through the selection of a relevant software module, which may predict a corresponding probability of detecting an interception device based on this signal. Where this probability is sufficiently high (e.g., greater than a threshold probability), the system may determine to temporarily deactivate the user authentication interface, in order to prevent any subsequent breaches relating to user authentication data. The system may reevaluate the presence of a credential interception device after a configurable time period, in order to rule out transient, inaccurate detection events and reactivate the user authentication interface if appropriate—this process may repeat indefinitely to provide long-term, dynamic protection against credential interception devices. In some embodiments, the system may adapt to conditions associated with a given user authentication interface over time by updating one or more detection software modules as response signals are analyzed and evaluated.

By reacting to response signals based on probabilities of detection, the system may improve the accuracy of detecting credential interception devices, thereby reducing the chance of false positives. By re-evaluating any response signals after a configurable period of time, the system may improve the detection of false positives even where these false positives are generated, as the system may determine whether the signal arising from any presumptive credential interception device has disappeared or changed in nature over time. Additionally or alternatively, in some embodiments, the system may adapt to changes in tactics used by credential interception devices (or, for example, adapt to the presence of additional, differing credential interception devices) by generating and/or selecting software modules according to the received response signals over time. Accordingly, the methods and systems disclosed herein improve detection of skimming events and reduce occurrence of false positives, by identifying transient, innocuous detection events. Moreover, the system may enable adaptation to novel skimming techniques over time through the conveyance of feedback, to improve selection of software modules. Thus, the system may improve analysis of response signals arising from novel or adaptive credential interception devices. This process enables the system to mitigate skimming while maintaining a longer up-time for the user authentication interface in cases a false positive is detected.

The system may cause transmission of a detection signal to detect any credential interception devices. For example, the system may cause transmission of a first detection signal for detecting presence of a credential interception device at a user authentication interface. In some embodiments, the system may, through a transceiver or transmitter, send out signals over the frequency range, where the frequency range may be useful or sensitive to interception devices. The range of frequencies of the transmitted signal may be determined by a pre-loaded software module or may be tuned to a most likely credential interception device. Transmitting such a frequency-dependent detection signal enables the system to probe and identify credential interception devices, while adapting the signal to novel interception mechanisms (e.g., through modification of the frequency range of the detection signal).

The system may determine a first probability of detection of a credential interception device from a resulting response signal. For example, based on receiving a first response signal in response to the first detection signal, the system may determine according to first detection criteria a first probability of detection of a first interception device at the user authentication interface. In some embodiments, the system may receive a response signal as a result of the transmitted detection signal, which may be influenced by the presence of an interception device. For example, the response signal may include a baseline signal corresponding to a signal unaffected by any irregularities such as credential interception devices. In the case of the presence of an interception device, the response signal may include a feature resulting from the interception device superimposed upon the baseline signal. Based on analyzing these features using detection criteria encoded into software modules (e.g., through comparison with signatures known to be associated with interception devices), the system may determine a probability that a given feature corresponds to one or more interception devices. By doing so, the system may accurately evaluate whether a response signal corresponds to the presence of an interception device and take preventative measures accordingly.

The system may transmit a command to deactivate the user authentication interface. For example, based on determining that the first probability is greater than a threshold, the system may transmit a first command to deactivate the user authentication interface. In some embodiments, the system may communicate a command to a user authentication interface or device, such as a user terminal, not to accept further tokens (e.g., passports or transport tokens) for authentication. The system may only transmit such a command when it has been determined that there is a high enough chance that an interception device has been detected, such as if the probability of detection is above a threshold. By doing so, the system may ensure that, in situations where an interception device is likely to be present, no further user information or authentication data may be stolen or skimmed.

The system may cause transmission of a second detection signal at a subsequent time and receive a second response signal in response. For example, at a subsequent time, the system may cause transmission of a second detection signal. Based on receiving a second response signal in response to the second detection signal, the system may determine, according to second detection criteria, a second probability of detection of a second interception device at the user authentication interface. The second detection criteria may be distinct from the first detection criteria. In some embodiments, the system may wait a configurable amount of time from the first detection signal and/or the resulting response signal before sending the second detection signal. For example, system may select a second software module in order to determine the nature of the transmitted detection signal. In disclosed embodiments, the system may utilize this selected software module to analyze the second response signal, in order to determine a second probability of detection of the first or a different interception device within the system. For example, the system may utilize different criteria with which to identify the presence of interception device-related features in the response signal (e.g., as superimposed on the baseline signal). By re-evaluating the presence of the interception device after a configurable time period, using different criteria for detecting, for example, different interception devices, the system may adapt to changing interception mechanisms brought on by technological advances or by intelligent, adaptive malicious software associated with the interception devices, such as frequency changes in their modes of operation. Moreover, the system may enable detection of false positives by determining the extent of a response signal's transience, based on detection after a configurable period of time. This configurable amount of time may be modified based on a likelihood that, over a given amount of time, a transient signal may be sustained, as compared to a signal arising from an installed interception device, which may be expected to remain over longer periods of time.

The system may transmit a command to activate the user authentication interface. For example, in response to determining that the second probability is lower than the threshold, the system may transmit a second command to activate the user authentication interface. In some embodiments, the system may determine, based on the second response signal, that there is unlikely to be an interception device associated with the given user authentication interface, because the second probability of detection is lower than a threshold probability. Thus, the system may transmit a command to reactivate the authentication interface and, subsequently, allow further authentication of users' tokens. In some embodiments, if the second probability of detection is greater than the threshold, the system may determine to maintain deactivation of the user authentication interface, to prevent any further malicious theft of user information. By re-evaluating the presence of any interception devices, the system may detect whether any presumptive detection of interception devices was transient and, accordingly, catch any instances of false positive detections. Additionally, the system may utilize various software modules or detection criteria to improve the robustness of the detection algorithm in the face of any changes to the received response signal. By doing so, the system may handle false positive results in a manner that minimizes down-time, while being sensitive to any signals that do not appear to be transient and, thus, may indeed correspond to an interception device.

Various other aspects, features, and advantages of the invention will be apparent through the detailed description of the invention and the drawings attached hereto. It is also to be understood that both the foregoing general description and the following detailed description are examples and are not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data) unless the context clearly dictates otherwise.

DETAILED DESCRIPTION OF THE DRAWINGS

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

Figure 1:
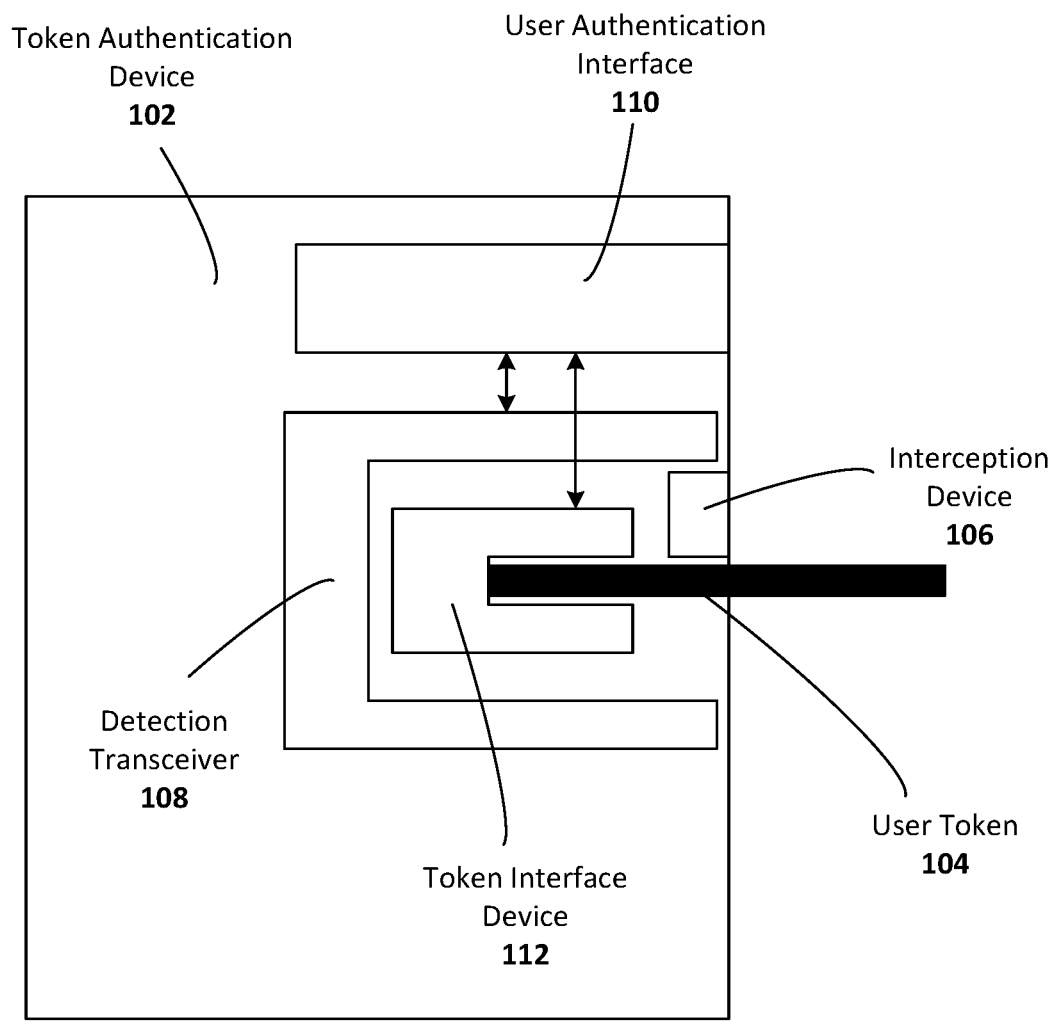
FIG. 1 shows an illustrative diagram of a system for detecting credential interception devices, in accordance with one or more embodiments.

FIG. 1 shows an illustrative diagram of a system for detecting credential interception devices incorporated into a system for a user authentication interface, in accordance with one or more embodiments. For example, system 100 includes a schematic of token authentication device 102, which enables verification of user credentials provided to the system via user tokens. Token authentication device 102 may include user authentication interface 110, capable of communicating with and interacting with users. User authentication interface 110 may communicate with token interface device 112, which enables communication between physical tokens (e.g., credential documents or cards, such as passports, identification cards, or public transport tokens), such as user token 104, and relevant authentication systems. Moreover, in disclosed embodiments, user authentication interface 110 may receive instructions from or transmit information to detection transceiver 108, which enables the system to detect whether any interception devices, such as interception device 106, have been installed in order to steal authentication credentials from users using the system. Detection transceiver 108 may, in some embodiments, include integrated logic, processors, and/or memory, such that the transceiver may process and analyze interception device signals independently Thus, the system integrates a detection system for identifying credential interception devices, such as a detector embodied by detection transceiver 108, as part of a user credential authentication system. By doing so, the system may detect for the presence of interception devices in situ, without requiring time-consuming manual checks.

Systems disclosed herein can provide credential verification. In disclosed embodiments, credential verification may include the evaluation of the authenticity or accuracy of information regarding credentials provided to the system. Such credentials may include information related to a user, such as data related to a user's identity. Authenticated identity data may include biometric data, such as a user's name, date of birth, and physical attributes. Credential data may also include security data provided by a given user, such as passwords, personal identification numbers (PINs), or user account identifiers, such as usernames or identity numbers. Credential data may be provided to the system via user input (e.g., through user authentication interface 110), or via insertion of a physical token including such information (e.g., user token 104 through token interface device 112). However, credential interception devices, such as interception device 106, may be installed by malicious entities in order to intercept such data, which may be sensitive or private. For example, malicious entities may install magnetic card or integrated chip readers adjacent to token interface devices in order to steal credential data provided to the system. Thus, in some disclosed embodiments, system 100 includes detection transceiver 108 to enable detection of such interception devices, in order to prevent skimming of personal information before any loss of user data.

In disclosed embodiments, system 100 may include user authentication interface 110, which may include any device, system, or machine capable of authenticating users. For example, user authentication interface 110 may include a display, one or more processors, storage media, and/or other peripherals, and may include virtual or physical machines. In a non-limiting example, user authentication interface may communicate with users with a display, such as through prompts, and receive information from users through keypads, touchscreens, or other input devices. The user authentication interface may also communicate with servers, systems, or client devices, such as through a network. For example, user authentication interface 110 may interface with other user authentication systems, such as those accessible through a network. By including a user authentication interface, user authentication device may both accept user credentials (e.g., through peripheral devices), and authenticate them through any relevant authentication servers or systems. In some embodiments, user authentication interface 110 may interact with a token interface device, such as token interface device 112. For example, user authentication interface 110 may read physical tokens through token interface device 112.

In disclosed embodiments, token interface device 112 may include a system that is capable of reading, writing, or accepting tokens, such as user token 104, and communicating such information to user authentication interface 110. In disclosed embodiments, a user token may include physically or virtually stored data enabling authentication of the user. For example, user token 104 can include a physical card that includes authentication information related to the user, such as a user identifier (e.g., a name), biometric information (e.g., a digital or physical photograph), or user account information, such as an account number, token expiration date, or security code. For example, a user token may include an identity document, such as a passport, driver's license, or identification card, or may include an account validation token (e.g., a two-factor authentication token, or a bank account token). In some embodiments, such authentication information may be stored in an encrypted form, such as using private-public key encryption or symmetric encryption, in order to protect the user information from malicious entities. A token may include integrated circuit chips, such as e-Passport chips, or EMV chips, in order to improve transfer of information between the user authentication interface and the user token. Additionally or alternatively, a token may include near-field communication (NFC) antennae for data communication with user authentication interface 110 (e.g., through token interface device 112). By reading user tokens, the system may authenticate data stored on these tokens, such as by communicating to an authentication server. However, information stored on user tokens may be intercepted (e.g., skimmed) through malicious credential interception devices and, as such, token authentication device 102 may benefit from improvements in the detection of credential interception devices.

The system may detect interception device 106, as shown in FIG. 1. Interception device 106 may be a credential interception device (e.g., a device designed to intercept, steal, or skim credential information). Additionally or alternatively, interception device 106 may be designed to intercept other information unrelated to credentials, such as user token metadata, timestamps, or other information from token authentication device 102. Interception device 106 may include one or more magnetic stripe readers that are capable of reading user tokens with magnetic strikes. In some embodiments, interception device 106 may include devices that may communicate with (e.g., receive information from) an NFC antenna associated with user token 104. In a non-limiting example, interception device 106 may be capable of reading integrated circuit chips on user tokens, such as EMV chips. Interception devices may communicate information skimmed from user tokens to external devices, such as through Bluetooth or other radiofrequency (RF) signals and, as such, may have an associated media access control (MAC) address or other identifiable information. Because interception devices 106 may have various designs, output various signals, and have various physical forms or functions, detecting interception devices is challenging and requires adaptation to new methods or mechanisms used for stealing credential information.

In some embodiments, system 100 is directed to an interception device detection system. For example, an interception device detection system can include a system that may detect the presence of interception devices, such as credential interception devices, a reasonable time after they are installed in the system by malicious actors. For example, an interception device detection system may include components such as detection transceiver 108, as well as one or more processors, storage devices, and/or communication devices. In some embodiments, the interception device detection system may include a receiver and/or transmitter, such as for RF communications. Such components may be linked to user authentication interface 110, or other components within token authentication device 102. By incorporating an interception device detection system within token authentication device 102, the system may improve the detection of interception devices, without relying on manual maintenance checks or reports of fraudulent actions based on credential theft.

For example, the interception device detection system may include detection transceiver 108. Detection transceiver 108 may include, for example, an antenna that may receive or transmit electromagnetic signals, such as those of an RF range. In some embodiments, the detection transceiver 108 may be configured to a sensitivity (e.g., of transmission and/or detection) of signals of a particular frequency, such as through the use of high-pass or low-pass filters incorporated into the transceiver. In some embodiments, the range of sensitivity of these signals may be modifiable, such as through instructions provided by one or more processors incorporated into the interception device detection system (e.g., through an integrated circuit associated with detection transceiver 108). By including a detection transceiver, system 100 may tune and transmit radiofrequency signals that may be sensitive to particular interception devices, such as interception device 106. For example, interception device 106, in response to encountering an RF signal of a first frequency, may react by transmitting an RF signal of a second frequency (e.g., through electromagnetic inductance). By enabling both transmission of the RF signal of the first frequency, as well as detection of the RF signal of the second frequency, the system may enable detection of interception devices on demand.

Figure 2:
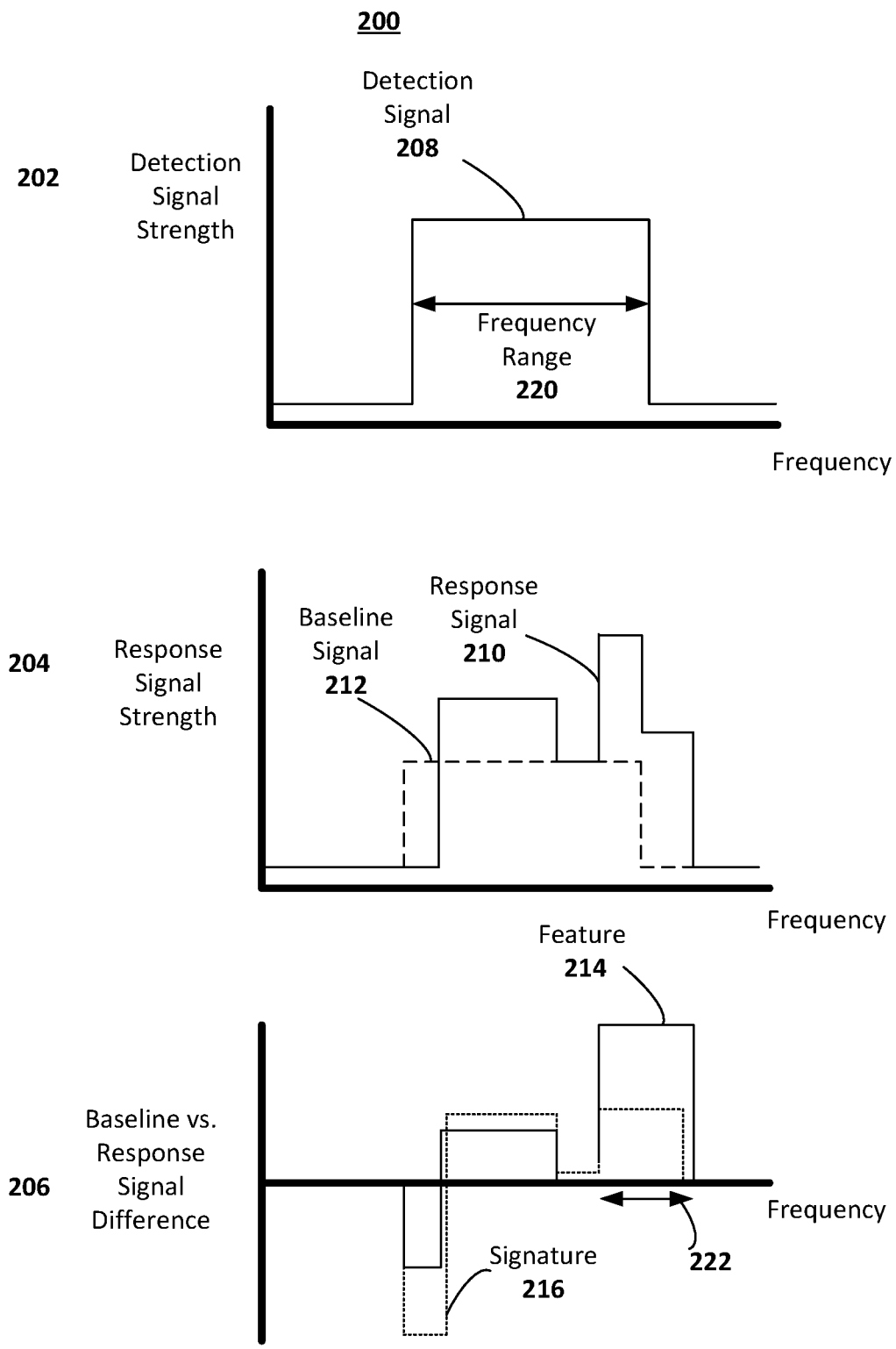
FIG. 2 shows an illustrative diagram of detection signals, response signals, detected features and reference signatures, in accordance with one or more embodiments.

FIG. 2 shows an illustrative diagram of signals 200 associated with system 100, such as detection signals, response signals, detected features and reference signatures, in accordance with one or more embodiments. For example, system 100 may transmit (e.g., through detection transceiver 108) detection signal 208 corresponding to frequency range 220, as shown on plot 202, to elicit a response from one or more interception devices installed in the system. For example, signals transmitted or received by the system may be analyzed as a function of signal frequency, as shown on the horizontal axis on plots 202-206. In response to detection signal 208, the system may receive response signal 210, as illustrated on plot 204. In disclosed embodiments, system 100 may analyze response signal 210 by considering baseline signal 212 and comparing the response signal to this baseline. The response signal may be associated with a frequency range corresponding to operation of an interception device, such as that depicted by frequency range 222. By comparing baseline signal 212 with response signal 210, as shown on plot 206, the system may determine one or more features, such as feature 214, associated with the response signal and compare these with one or more signatures, such as signature 216, corresponding to one or more interception devices. By performing such an analysis of received signals, the system may determine a probability of detection of one or more interception devices (e.g., a likelihood of the presence of a credential interception device) based on known knowledge of the nature of the response of such interception devices.

For example, system 100 may transmit one or more detection signals using detection transceiver 108. For example, the system may transmit detection signal 208, corresponding to electromagnetic waves of frequency range 220. In some embodiments, the system may transmit the detection signal where all frequencies within frequency range 220 are transmitted with a similar frequency strength. In some embodiments, the system may transmit some frequencies with different signal strengths. Detection transceiver 108 may transmit RF waves directed to a particular portion of token authentication device 102, such as through a directional antenna, in order to be sensitive to only portions of the device that may be most susceptible to the installation of interception devices. In some disclosed embodiments, the system may transmit frequencies in an omnidirectional fashion, so as to detect interception devices that may be hidden or installed in unconventional locations. For example, frequency range 220 of the detection signal, as well as the time at which the detection signal is transmitted, may be modified by the system to adapt to changing conditions. For example, frequency range 220 may be expanded or changed if the system receives information about the possible presence of an interception device that operates at or is detectable with different frequencies outside the original frequency range of the detection signal.

The detection signal may be an RF signal (e.g., a radiofrequency signal that is input into the system by the detection transceiver). In disclosed embodiments, a radiofrequency signal may include an electronic signal at radiofrequencies, including signals carried through electromagnetic radiation and/or signals carried through waveguides or circuits. For example, RF signals may include alternating currents or electromagnetic radiation with frequencies of 300 GHz or below. Because RF signals may readily interact with metallic objects, as well as charged particles, such as electrons, RF signals may be sensitive to changes in electronic environments within the system. As such, RF signals may confer the benefit of enabling detection of interception devices, such as credential interception devices, installed maliciously in authentication devices, such as token authentication device 102.

The system may receive response signal 210, as shown on plot 204 in FIG. 2. In disclosed embodiments, response signal 210 may include any signals received by the system, such as through detection transceiver 108. For example, response signal 210 may receive signals in response to detection signal 208, either simultaneous to the transmission of detection signal 208, or subsequent to transmission. In some embodiments, response signal 210 may be received without any prior detection signal, such as in the event that one or more interception devices transmit signals independently, such as to communicate with external devices. That is, in some cases, response signal 210 may be received in response to events other than the transmission of detection signal 208. Response signal 210 may be or include baseline signal 212 and may be associated with one or more frequencies of operation of interception devices, such as that depicted through frequency range 222.

For example, response signal 210 may include all or parts of baseline signal 212. In disclosed embodiments, baseline signal 212 may include a signal corresponding to an expected or previously measured response signal when no interception device is present. For example, baseline signal 212 may reflect a response signal measured when the token authentication device is known to be free of any external devices and, as a result, may reflect the response of the inherent system to detection signal 208. Baseline signal 212 may include signals of the same frequency range as the detection signal (e.g., frequency range 220) or may include signals of different frequencies, such as due to non-linearity in the system's inherent response to the response signal. In some embodiments, baseline signal 212 may be determined by measuring the average response signal from the system to detection signal 208 over a long period of time, such as a period of time where no interception device is believed to be installed. By determining a baseline signal, the system may be more sensitive to any changes in the environment of the token authentication device, and, as such, the system may improve interception device detection capabilities.

The system may compare baseline signal 212 with response signal 210 in order to determine a probability of the presence of one or more interception devices (e.g., credential interception devices). For example, as shown on plot 206, the baseline signal may be subtracted from the response signal in order to determine feature 214. In disclosed embodiments, feature 214 may include portions of the response signal that may not be expected and, thus, may be associated with unexpected changes to the system, as per a measured baseline signal, for example. By determining a feature, such as feature 214, from the response signal, the system may further analyze the likelihood that a change in the system's RF response to the detection signal is due to the installation of a malicious device, such as a credential interception device.

The system may compare feature 214 with a signature 216. In disclosed embodiments, a signature may include a known signal associated with one or more interception devices (e.g., credential interception devices). For example, as depicted on plot 206 in FIG. 2, signature 216 may include a signal that an interception device is expected to transmit in response to the detection signal, such as a signal that is superimposed upon baseline signal 212. For example, signature 216 may include elements that are associated with the interception device itself, such as a signal associated with a frequency range corresponding to the interception device's operation (e.g., frequency range 222). In some embodiments, signature 216 may be expressed in the form of a waveform (e.g., a waveform signature, as reflected in real vector space) rather than in frequency or reciprocal vector spaces. In some embodiments, the signature may include other features as a result of linear or non-linear interactions with detection signal 208. By receiving, comparing, measuring, and/or analyzing signatures corresponding to interception devices, the system may utilize such knowledge to determine the likelihood that a given response signal corresponds to a known interception device and, as such, take protective action to protect users' credentials, for example. For example, the system may compare signature 216 corresponding to an interception device and feature 214 to determine a probability of response signal 210 reflecting the presence of the given interception device.

In some embodiments, interception devices installed in the system, such as interception device 106, may have a frequency range corresponding to its operation, such as frequency range 222 as shown on plot 204 in FIG. 2. For example, interception device 106 may transmit information intercepted from user token 104 using Bluetooth or other RF signals to external devices. In disclosed embodiments, the frequency range corresponding to the operation of the interception device, such as the frequency range associated with the interception device's communications or detection mechanisms, may be measured, evaluated, analyzed or determined by the system and, as such, may be received through response signal 210. As an illustrative example, response signal 210, when compared to baseline signal 212, elucidates feature 214, with a frequency range 222 that may correspond to operation of an interception device, such as the interception device's communication frequency to external devices.

In some embodiments, the system may determine a similarity metric between the measured feature (e.g., feature 214) and one or more signatures (e.g., signature 216). For example, the system may generate vectors representing the feature and the signature of a known interception device respectively and determine a normalized inner product between the vectors. This normalized inner product may quantify similarity between the feature and the signatures and, as such, may be included within a calculation of the similarity metric. In disclosed embodiments, the system may determine a probability of detection of an interception device based on this similarity metric. By doing so, the system may utilize prior knowledge regarding the nature of interception devices and their response to transmitted RF signals and, as such, may make a more accurate determination as to the likelihood of the presence of an interception device.

In some embodiments, the system may detect a feature within the response signal that includes information identifying an interception device. In some embodiments, the system may extract a device identifier associated with a feature within the response signal. For example, the response signal may include encoded information regarding a device identifier corresponding to the interception device. For example, a device identifier may include a MAC address or an internet protocol (IP) address associated with the interception device (e.g., as used by the interception device to transmit stolen credential information to external entities). In some embodiments, the system may compare such a device identifier with device identifiers corresponding to interception devices in a database of interception devices. For example, certain interception devices may already be known to have certain subsets of MAC addresses or be associated with particular IP addresses. Thus, the system may generate a probability of detection of an interception device based on making a match between a device identifier detected within a response signal and a known device identifier (or a known pattern of device identifiers) corresponding to interception devices.

In some embodiments, the system may generate a request for validation confirmation, such as to a user device associated with the user authentication interface. For example, the system may make a determination as to whether the presence of an interception device is likely. In response to this determination, the system may request manual confirmation, for training or confirmation purposes. The system may generate a request for validation confirmation, including, for example, an identifier of the relevant token authentication device, such as a physical address or machine number. The system may transmit this request to a user device associated with the token authentication device, such as a device associated with a system administrator of the authentication server. In response, a manual check of the presence of interception devices may be made. The system may receive a validation confirmation, which can include a confirmation of whether an interception device is present or not based on a manual check of the system. For example, the system may feed the relevant response signal and validation confirmation into a machine learning model. By doing so, the system may continually learn from determinations of whether a credential interception device is present and make better decisions based on response signals in the future.

Figure 3:
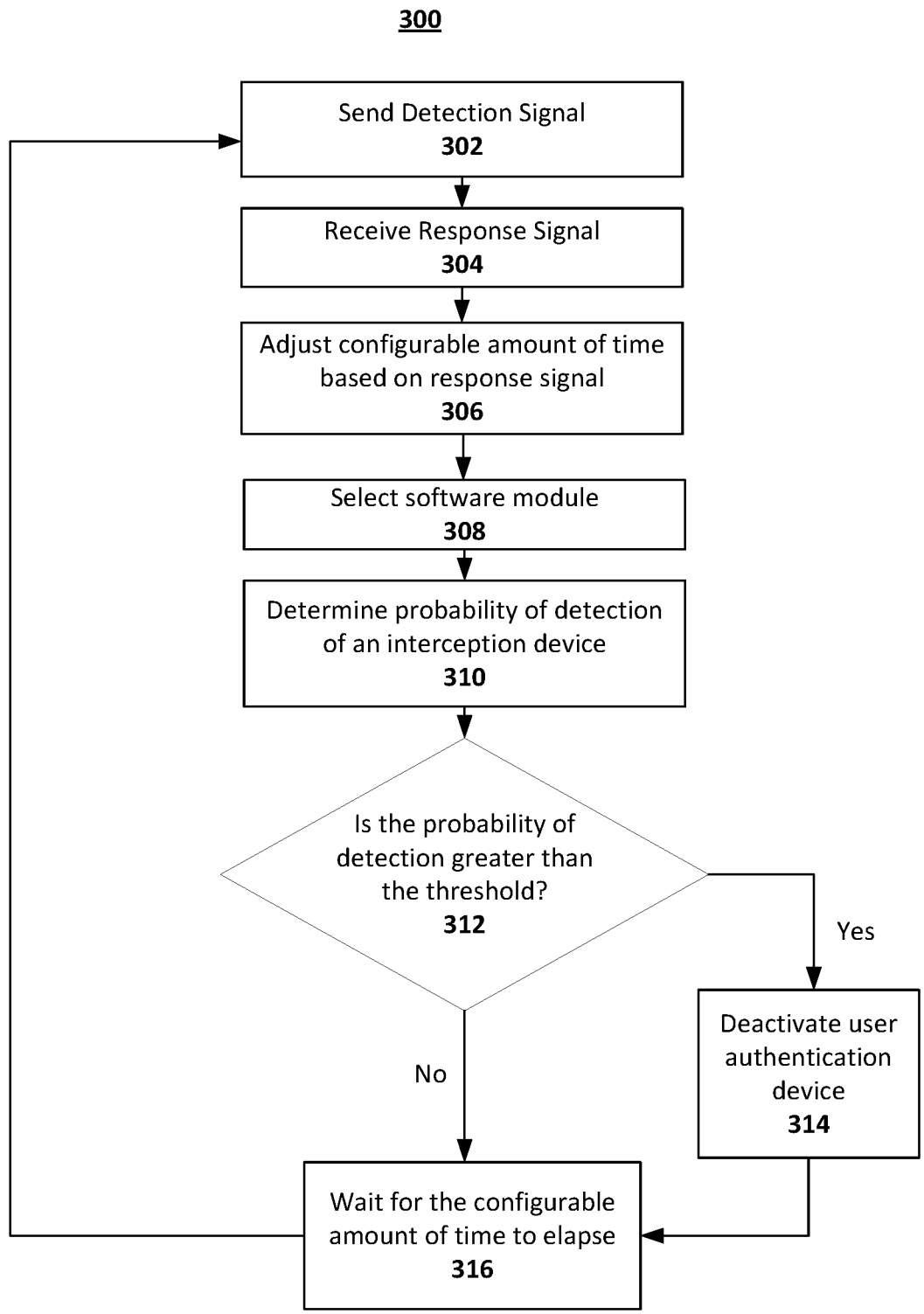
FIG. 3 shows an illustrative flowchart for a system for detecting credential interception devices, in accordance with one or more embodiments.

FIG. 3 shows illustrative flowchart 300 for a system for detecting credential interception devices, in accordance with one or more embodiments. For example, at step 302, system 100, through detection transceiver 108, may send a detection signal. At step 304, the system may receive a response signal, such as from an installed credential interception device, in response to the detection signal. At step 306, the system may determine and/or adjust a configurable amount of time based on the response signal. At step 308, the system may select a software module, such as a module that may enable analysis of the response signal. At step 310, the system may determine a probability of detection of the presence of an interception device. At step 312, the system may determine whether the probability of detection is greater than a threshold. If the probability of detection is indeed greater than the threshold, at step 314, the system may transmit a signal to deactivate user authentication interface 110. Otherwise, or subsequently, at step 316, the system may wait for the configurable amount of time to elapse, before transmitting another detection signal at step 302.

Flowchart 300 may enable the system to check for interception devices periodically (e.g., with a frequency controllable by a configurable amount of time). In disclosed embodiments, a configurable amount of time may reflect a time period for which, upon presumptive detection of an interception device, the user authentication interface may be deactivated. For example, upon determining that the probability of detecting one or more interception devices is greater than a threshold value, as in step 312, the system may transmit a command to user authentication interface 110 to deactivate and, as such, prevent the acceptance of further user tokens. By doing so, the system may prevent loss or theft of credential data following detection of a malicious credential interception device, for example.

The system can re-check for interception devices following the configurable amount of time. For example, the system may send another detection signal after a deactivation time has elapsed that is greater than the configurable amount of time. In disclosed embodiments, the deactivation time may refer to an amount of time for which the user authentication interface has been deactivated (e.g., is rejecting user requests for authentication of user tokens). Thus, the system may restart the detection process upon the deactivation time being greater than the configurable amount of time. By doing so, the system may determine whether the first presumptive detection of the interception device may have been transient or not, based on whether the signal is persistent at later times. The configurable amount of time, then, may be modified based on the likelihood that a signal from an interception device may be persistent based on, for example, common transient signals in the environment around the token authentication device. For example, users' keys or personal electronics may cause a response signal similar to an interception device, but may be expected to be more transient than an installed interception device; the configurable amount of time may thus be determined based on the amount of time where such a transient signal may be expected to disappear or change. By utilizing feedback in interception device detection in such a fashion, the system may reduce the number of false-positive results, and may cause an increase in the up-time for the token authentication device by enabling reactivation of the device upon determination of a transient signal. Additionally, feedback may be leveraged into choice of how to analyze signals, such as through changing detection criteria or software modules based on such findings.

The system may use a timestamp, for example, to determine a receipt time of a signal. In disclosed embodiments, a timestamp may include a digital record of the time of the occurrence of an event. For example, a timestamp may include a date, time, system clock setting (e.g., Unix time), or other temporal marker corresponding to the occurrence of an event. The system may determine the timestamp using a system clock setting, such as a time setting standardized over the system, network, or a collection of token authentication devices. By doing so, the system may ensure that any recorded times are consistent with one another. As such, the use of standardized timestamps may improve the tracking of interception device detection events and, consequently, may improve analysis and evaluation of response signals when they are received.

In some embodiments, the system may utilize detection criteria. In disclosed embodiments, detection criteria may include a process, algorithm, or ruleset for analyzing signals and/or determining a probability of detection of one or more interception devices. The system may utilize detection criteria to determine whether a signal likely corresponds to the presence of an interception device. For example, the detection criteria may include a method of calculating a probability of detection, such as through the extraction of features within the signal and comparing such features to a signature of a known interception device through a similarity metric. In a non-limiting example, the detection criteria specifies a threshold with which the probability of detection may be compared in order to determine whether there is a likelihood of the presence of a credential interception device. In some embodiments, the detection criteria may include a module, such as a software module, or may include a method or criteria for choosing a software module depending on the nature of received response signals. Additionally or alternatively, the detection criteria may specify a configurable time period (or a method of calculating the same) for subsequently re-probing the system for inclusion of interception devices. By adapting (e.g., selecting or modifying) the detection criteria depending on the received response signal, the system may improve its resilience and robustness against adapting credential interception methods by malicious entities.

Detection criteria may include modules. In disclosed embodiments, modules may include specific virtual or physical methods, processes, or algorithms that may be used to analyze response signals for detection of interception devices that can be selected independently. Modules may include software modules (e.g., particular software-based programs) that may be selected depending on the nature of response signals, such as at step 308 shown in flowchart 300 in FIG. 3. For example, software modules may include software-based programs that may be specialized, such as directed towards detecting particular types of signals emanating from specific types of interception devices. A software module may incorporate machine learning models that may be capable of detecting features and comparing such features with signatures corresponding to known interception devices. In some embodiments, a module may include operation or activation of a physical component or hardware, such as the activation of a specialized transmitter and/or receiver that may be more sensitive to a particular received response signal. As a non-limiting example, the system, through selection of a relevant hardware module, may alter the range of transmitted frequencies of signals (e.g., through modification of an integrated circuit attached to the detection transceiver or through selection of another transceiver within the token authentication system) depending on the frequencies of signals received or detected. By enabling selection of individual software or hardware modules, the system may better react to any adaptations in interception devices or the mechanisms of their operation. Thus, the system mitigates against the ability of malicious entities from making modifications to interception devices to avoid detection.

Detection criteria and/or software modules can enable the system to calculate probabilities of detection of one or more interception devices, such as at step 310 in flowchart 300 in FIG. 3. In disclosed embodiments, a probability of detection may include a quantitative measure of a likelihood of the presence of an interception device. For example, the system may determine a probability of detection of a first interception device, such as a particular type or model of a device, or a particular device itself. In some embodiments, each software module or set of detection criteria may be suitable for detecting different models, types, or mechanisms of credential interception devices. In some embodiments, a probability of detection may be determined with respect to the presence of one or more interception devices (e.g., of any interception devices at all). Such a probability of detection may be calculated by analyzing probabilities of detection of specific interception devices, and synthesizing these probabilities to calculate an overall probability of detection of the presence of any interception device. In some embodiments, the system may calculate the probability of detection of a particular interception device by comparing a similarity metric of a feature within a response signal to a signature of the given interception device. The system can calculate the probability of detection of one or more interception devices through a machine learning model trained with response signals or features, as well as training data regarding the presence of interception devices. In a non-limiting example, software modules or detection criteria may use any of these methods to determine probabilities of detection.

In some embodiments, the system may compare the probability of detection with a threshold. In disclosed embodiments, a threshold may include a probability of detection at which the presence of an interception device is considered to be likely or presumptive. For example, a threshold may be set by detection criteria, a software module, or by a system administrator or server through a command or communication. In some embodiments, different probabilities of detection corresponding to different interception devices may have differing thresholds. For example, Bayesian analysis may be utilized to determine the threshold. As an illustrative example, a commonly encountered interception device may require a lower threshold probability before it is determined that it is likely to be present, while an interception device known to be rare or costly may exhibit a higher threshold. In such a manner, the system can reduce the chances of false positive results while remaining sensitive to common interception devices. By comparing the probability of detection with a threshold, the system may have improved flexibility and accuracy in determining the presence of interception devices, even if such evidence is not unambiguous. By doing so, the system may process response signals probabilistically in such a way that may reduce the chance of false positives, while enabling adaptation of the detection system to any novel interception devices or methods.

In some embodiments, the system may generate a command to deactivate or activate a user authentication interface (e.g., based on the comparison of probabilities of detection with thresholds). In disclosed embodiments, a command to deactivate or activate a user authentication interface may include a communication, transmission, signal, or command that causes deactivation or activation of a user authentication interface respectively. In some embodiments, the command to deactivate may be a message sent to the user authentication interface to reject any token credential authentication events. For example, based on determining that the presence of a credential interception device is likely (e.g., through comparison of a probability of detection with a threshold), the system may generate a command to deactivate the user authentication interface 110 to prevent any security breaches or theft of credentials. After waiting for the configurable time period, the system may reevaluate the system environment for the presence of the same or different interception devices (e.g., through selection of a same or a different software module). If the likelihood of the presence of an interception device is found to be low, the system can transmit a command to activate (e.g., reactivate) the user authentication interface, in order to reduce the token authentication device's down-time and correct any prior false positive detection events.

Figure 4:
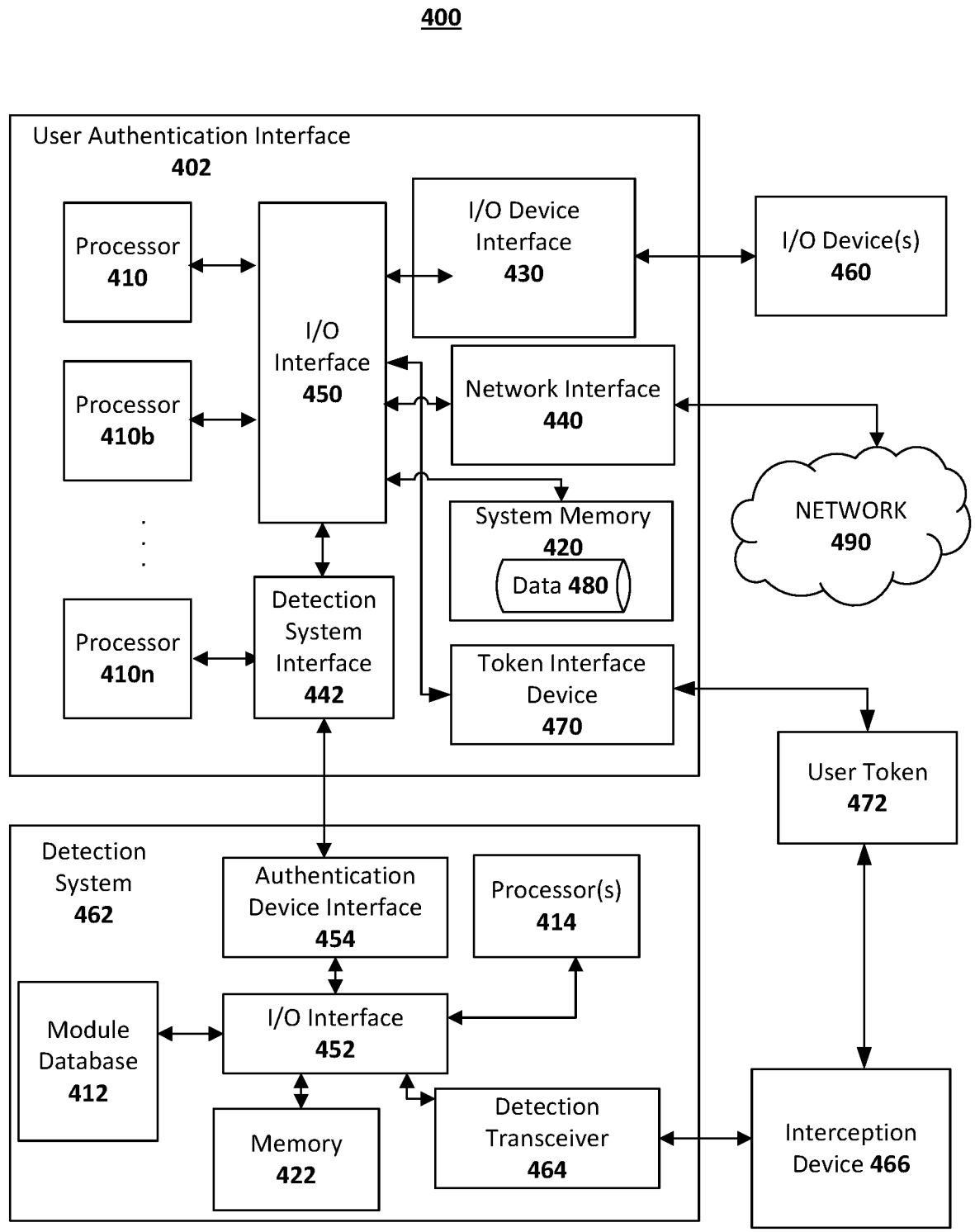
FIG. 4 shows an illustrative diagram of a system for detecting credential interception devices, in accordance with one or more embodiments.

FIG. 4 shows an example system for a token authentication device (e.g., computing system 400) that includes a detection system for interception devices, accepts user tokens, and may be connected to a network, in accordance with one or more embodiments of this disclosure. The components of FIG. 4 may be used to perform some or all operations discussed in relation to FIGS. 1-3. Furthermore, various portions of the systems and methods described herein may include or be executed on one or more computer systems similar to user authentication interface 402. Further, processes and modules described herein may be executed by one or more processing systems similar to that of user authentication interface 402.

Computing system 400 may include user authentication interface 402, which may interact with input/output (I/O) device(s) 460, user token 472, and network 490. Network 490 may be connected to one or more devices, such as interception device 466. User authentication interface 402 may include one or more processors (e.g., processors 410*a*-410*n*) coupled to system memory 420, an I/O device interface 430, a detection system interface 442, token interface device 470, and a network interface 440 via an I/O interface 450. Detection system 462 may include authentication device interface 454, processor(s) 414, I/O interface 452, module database 412, detection transceiver 464, and/or memory 422.

A processor may include a single processor or a plurality of processors (e.g., distributed processors). A processor may be any suitable processor capable of executing or otherwise performing instructions. A processor may include a central processing unit (CPU) that carries out program instructions to perform the arithmetical, logical, and I/O operations of user authentication interface 402. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 420 or memory 422). User authentication interface 402 may be a uni-processor system including one processor (e.g., processor 410a or processor(s) 414), or a multi-processor system including any number of suitable processors (e.g., 410a-410n). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, for example, an FPGA (field-programmable gate array) or an ASIC (application-specific IC). User authentication interface 402 may include a plurality of computing devices (e.g., distributed computer systems) to implement various processing functions.

I/O device interface 430 may provide an interface for connection of one or more I/O devices 460 to user authentication interface 402. I/O devices may include devices that receive input (e.g., from a user) or output information (e.g., to a user). I/O devices 460 may include, for example, a graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 460 may be connected to user authentication interface 402 through a wired or wireless connection. I/O devices 460 may be connected to user authentication interface 402 from a remote location. I/O devices 460 located on remote computer systems, for example, may be connected to user authentication interface 402 via a network and network interface 440.

Network interface 440 may include a network adapter that provides for connection of user authentication interface 402 to a network. Network interface 440 may facilitate data exchange between user authentication interface 402 and other devices connected to the network. Network interface 440 may support wired or wireless communication. The network may include an electronic communication network, such as the Internet, a local area network (LAN), a wide area network (WAN), a cellular communications network, or the like.

System memory 420 and/or memory 422 may be configured to store program instructions or data 480. Program instructions may be executable by a processor (e.g., one or more of processors 410a-410n or 414) to implement one or more embodiments of the present techniques. Program instructions may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program may be deployed to be executed on one or more computer processors located locally at one site or distributed across multiple remote sites and interconnected by a communication network.

System memory 420 and/or memory 422 (e.g., a storage device) may include a tangible program carrier having program instructions stored thereon. A tangible program carrier may include a non-transitory, computer-readable storage medium. A non-transitory, computer-readable storage medium may include a machine-readable storage device, a machine-readable storage substrate, a memory device, or any combination thereof. Non-transitory, computer-readable storage medium may include non-volatile memory (e.g., flash memory, read-only memory (ROM), programmable ROM (PROM), erasable PROM (EPROM), electrically EPROM memory (EEPROM)), volatile memory (e.g., random access memory (RAM), static random access memory (SRAM), synchronous dynamic RAM (SDRAM)), bulk storage memory (e.g., CD-ROM and/or DVD-ROM, hard drives), or the like. System memory 420 may include a non-transitory, computer-readable storage medium that may have program instructions stored thereon that are executable by a computer processor (e.g., one or more of processors 410a-410n) to cause the subject matter and the functional operations described herein. A memory (e.g., system memory 420) may include a single memory device and/or a plurality of memory devices (e.g., distributed memory devices).

The system may use modules, such as those within module database 412. Module database 412 may interact, via I/O interface 452, with other components within detection system 462, such as processor(s) 414, memory 422, detection transceiver 464, or authentication device interface 454. By including a module database within detection system 462, the system may react to any interception devices, such as interception device 466, detected at detection transceiver 464, and adapt to the received response signals accordingly. Interception device 466 may attempt to communicate with and steal credentials stored on user token 472.

I/O interface 450 may be configured to coordinate I/O traffic between processors 410a-410n, system memory 420, network interface 440, I/O devices 460, and/or other peripheral devices. I/O interface 452 may be configured to coordinate I/O traffic between processor(s) 414, memory 422, module database 412, detection transceiver 464 and/or other devices in the token. I/O interface 450 and/or I/O interface 452 may perform protocol, timing, or other data transformations to convert data signals from one component (e.g., system memory 420 or memory 422) into a format suitable for use by another component (e.g., processors 410a-410n or processor(s) 414). I/O interface 450 may include support for devices attached through various types of peripheral buses, such as a variant of the Peripheral Component Interconnect (PCI) bus standard or the Universal Serial Bus (USB) standard.

User authentication interface 402 may include detection system interface 442, which may provide a method to send and receive information regarding detection of interception devices to the user authentication interface. For example, user authentication interface 402 may send and receive commands to activate and/or deactivate the user authentication interface 402 based on a probability of detection of one or more interception devices. In some embodiments, detection system interface 442 may process information to provide to processors 410*n* or I/O interface 450. Detection system 462 may include authentication device interface 454, which may provide a method to send and receive information from the user authentication interface when attached (or when interfacing wirelessly). For example, authentication device interface 454 may send and receive commands to activate and/or deactivate the user authentication interface 402 based on a probability of detection.

Embodiments of the techniques described herein may be implemented using a single instance of user authentication interface 402, or multiple user authentication interfaces 402 configured to host different portions or instances of embodiments. Multiple user authentication interfaces 402 may provide for parallel or sequential processing/execution of one or more portions of the techniques described herein.

Those skilled in the art will appreciate that user authentication interface 402 is merely illustrative and is not intended to limit the scope of the techniques described herein. User authentication interface 402 may include any combination of devices or software that may perform or otherwise provide for the performance of the techniques described herein. For example, user authentication interface 402 may include or be a combination of a cloud computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, a Global Positioning System (GPS), or the like. User authentication interface 402 may also be connected to other devices that are not illustrated or may operate as a stand-alone system. In addition, the functionality provided by the illustrated components may, in some embodiments, be combined in fewer components, or distributed in additional components. Similarly, in some embodiments, the functionality of some of the illustrated components may not be provided, or other additional functionality may be available.

The system may include a terminal, such as user authentication interface 402. In disclosed embodiments, a terminal may refer to any device that may interface with a user. In disclosed embodiments, a "terminal" may include a device that interfaces with a payment card (e.g., token interface device 470) in order to make electronic funds transfers. A terminal may include a keypad for entering PINs, a screen, and a means for capturing information from account cards, such as a chip reader, an NFC transmitter and receiver, or a magnetic stripe reader. The terminal may interface with an electronic payment system or another network and may communicate with an issuer of the token or another trusted entity.

Figure 5:
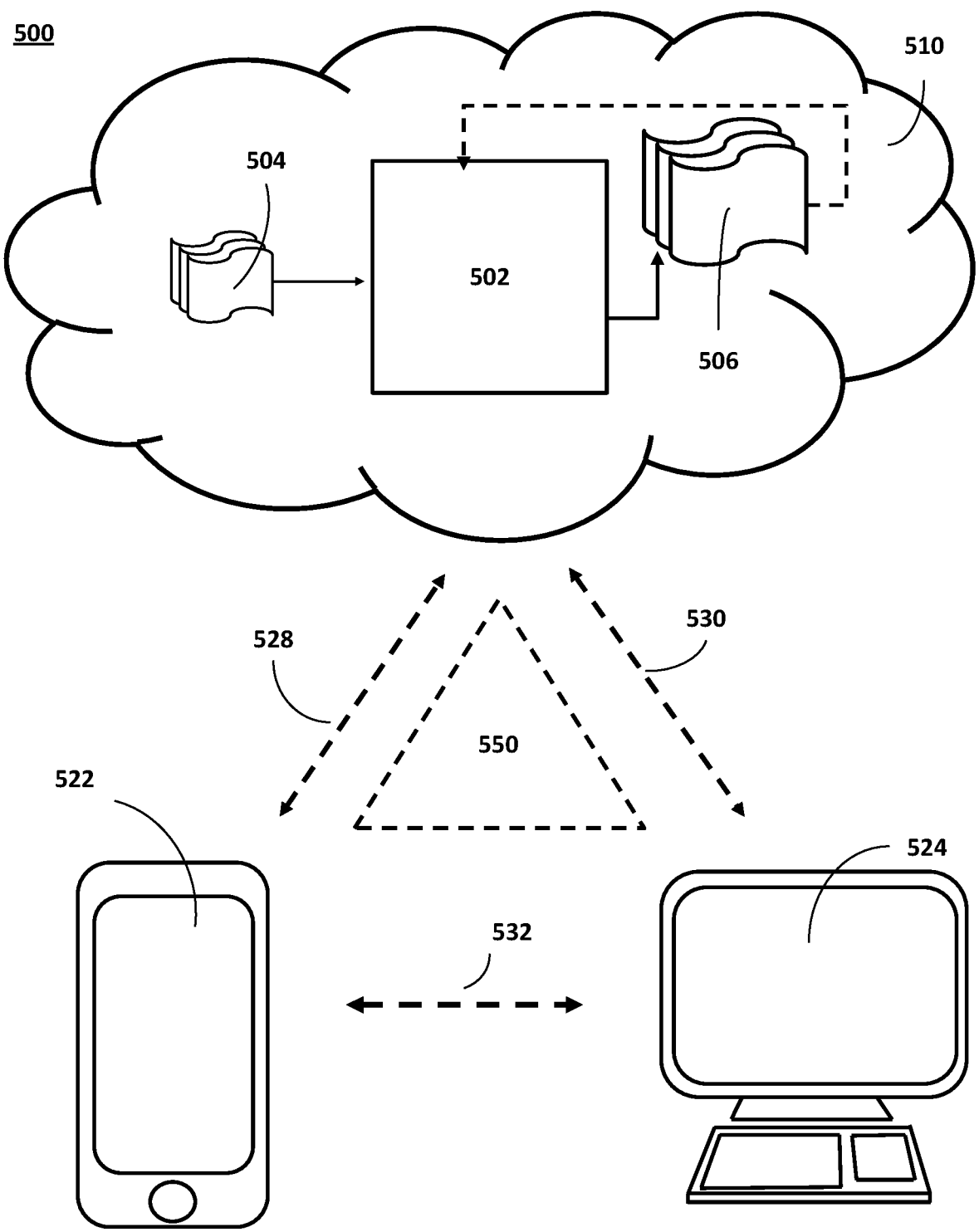
FIG. 5 shows an illustrative diagram of a network associated with a system for detecting credential interception devices, in accordance with one or more embodiments.

FIG. 5 shows an illustrative diagram of a network associated with a system for detecting credential interception devices, in accordance with one or more embodiments. For example, FIG. 5 may show illustrative components for mitigating theft or interception of user credential information from user tokens, such as identity cards, based on an adaptive detection system. As shown in FIG. 5, system 500 may include mobile device 522 and terminal 524. For example, terminal 524 may correspond to or interface with user authentication interface 402. While shown as a smartphone and personal computer, respectively, in FIG. 5, it should be noted that mobile device 522 and terminal 524 may be any computing device, including, but not limited to, a laptop computer, a tablet computer, a handheld computer, and other computer equipment (e.g., a server), including "smart," wireless, wearable, and/or mobile devices.

FIG. 5 also includes cloud components 510. For example, cloud components 510 may include or connect to a network (e.g., a payment network) or a server. Cloud components 510 may alternatively be any computing device as described above and may include any type of mobile terminal, fixed terminal, or other device. For example, cloud components 510 may be implemented as a cloud computing system and may feature one or more component devices. It should also be noted that system 500 is not limited to three devices. Users may, for instance, utilize one or more devices to interact with one another, one or more servers, or other components of system 500. For example, cloud components 510 may include servers 502 or 504, as well as user device 506. It should be noted that while one or more operations are described herein as being performed by particular components of system 500, these operations may, in some embodiments, be performed by other components of system 500. As an example, while one or more operations are described herein as being performed by components of mobile device 522, these operations may, in some embodiments, be performed by components of cloud components 510. In some embodiments, the various computers and systems described herein may include one or more computing devices that are programmed to perform the described functions. Additionally or alternatively, multiple users may interact with system 500 and/or one or more components of system 500. For example, in one embodiment, a first user and a second user may interact with system 500 using two different components.

With respect to the components of mobile device 522, terminal 524, and cloud components 510, each of these devices may receive content and data via I/O paths. Each of these devices may also include processors and/or control circuitry to send and receive commands, requests, and other suitable data using the I/O paths. The control circuitry may comprise any suitable processing, storage, and/or I/O circuitry. Each of these devices may also include a user input interface and/or user output interface (e.g., a display) for use in receiving and displaying data. For example, as shown in FIG. 5, both mobile device 522 and terminal 524 include a display upon which to display data (e.g., conversational response, queries, and/or notifications).

Additionally, as mobile device 522 and terminal 524 are shown as a smartphone and personal computer, these displays also act as user input interfaces. It should be noted that in some embodiments, the devices may have neither user input interfaces nor displays and may instead receive and display content using another device (e.g., a dedicated display device such as a computer screen and/or a dedicated input device such as a remote control, mouse, voice input, etc.). Additionally, the devices in system 500 may run an application (or another suitable program). The application may cause the processors and/or control circuitry to perform operations related to generating dynamic conversational replies, queries, and/or notifications.

Each of these devices may also include electronic storages. The electronic storages may include non-transitory storage media that electronically stores information. The electronic storage media of the electronic storages may include one or both of (i) system storage that is provided integrally (e.g., substantially non-removable) with servers or client devices or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storages may store software algorithms, information determined by the processors, information obtained from servers, information obtained from client devices, or other information that enables the functionality as described herein.

FIG. 5 also includes communication paths 528, 530, and 532. Communication paths 528, 530, and 532 may include the Internet, a mobile phone network, a mobile voice or data network (e.g., a 5G or long term evolution (LTE) network), a cable network, a public switched telephone network, or other types of communications networks or combinations of communications networks. Communication paths 528, 530, and 532 may separately or together include one or more communications paths, such as a satellite path, a fiber-optic path, a cable path, a path that supports Internet communications (e.g., internet protocol television (IPTV)), free-space connections (e.g., for broadcast or other wireless signals), or any other suitable wired or wireless communications path or combination of such paths. The computing devices may include additional communication paths linking a plurality of hardware, software, and/or firmware components operating together. For example, the computing devices may be implemented by a cloud of computing platforms operating together as the computing devices.

Cloud components 510 may include servers, computing devices, LANs, or mobile devices. For example, cloud components 510 may include servers 502 or 504, as well as user device 506. Cloud components 510 may access one or more blockchain networks. Additionally, cloud components 510 may access authentication data and/or receive authentication data, such as credential data associated with user tokens. In some embodiments, cloud components 510 may access information relating to interception devices, such as databases of common signals or signatures associated with credential interception devices, or databases of interception device identifiers. For example, cloud components 510 may access encrypted credential information and may possess an associated key for decryption and validation of the user token's credential data.

Cloud components 510 may include a model, which may be a machine learning model, artificial intelligence model, deep learning model, etc. (which may be referred to collectively as "models" herein). The model may take inputs and provide outputs. The inputs may include multiple datasets, such as a training dataset and a test dataset. Each of the plurality of datasets (e.g., inputs) includes data subsets related to user data, predicted forecasts and/or errors, and/or actual forecasts and/or errors. In some embodiments, outputs may be fed back to the model as input to train the model (e.g., alone or in conjunction with user indications of the accuracy of outputs, labels associated with the inputs, or with other reference feedback information). For example, the system may receive a first labeled feature input, wherein the first labeled feature input is labeled with a known prediction for the first labeled feature input. The system may then train the first machine learning model to classify the first labeled feature input with the known prediction (e.g., whether a credential interception device is present in the system or a likelihood of its presence).

In a variety of embodiments, the model may update its configurations (e.g., weights, biases, or other parameters) based on the assessment of its prediction (e.g., outputs) and reference feedback information (e.g., user indication of accuracy, reference labels, or other information). In a variety of embodiments where the model is a neural network, connection weights may be adjusted to reconcile differences between the neural network's prediction and reference feedback. In a further use case, one or more neurons (or nodes) of the neural network may require that their respective errors are sent backward through the neural network to facilitate the update process (e.g., backpropagation of error). Updates to the connection weights may, for example, be reflective of the magnitude of error propagated backward after a forward pass has been completed. In this way, for example, the model may be trained to generate better predictions.

In some embodiments, the model may include an artificial neural network. In such embodiments, the model may include an input layer and one or more hidden layers. Each neural unit of the model may be connected with many other neural units of the model. Such connections can be enforcing or inhibitory in their effect on the activation state of connected neural units. In some embodiments, each individual neural unit may have a summation function that combines the values of all of its inputs. In some embodiments, each connection (or the neural unit itself) may have a threshold function such that the signal must surpass it before it propagates to other neural units. The model may be self-learning and trained, rather than explicitly programmed and can perform significantly better in certain areas of problem-solving, as compared to traditional computer programs. During training, an output layer of the model may correspond to a classification of the model, and an input known to correspond to that classification may be input into an input layer of the model during training. During testing, an input without a known classification may be input into the input layer, and a determined classification may be output.

In some embodiments, the model may include multiple layers (e.g., where a signal path traverses from front layers to back layers). In some embodiments, back-propagation techniques may be utilized by the model where forward stimulation is used to reset weights on the "front" neural units. In some embodiments, stimulation and inhibition for the model may be more free-flowing, with connections interacting in a more chaotic and complex fashion. During testing, an output layer of the model may indicate whether or not a given input corresponds to a classification of the model (e.g., whether a response signal likely corresponds to a particular interception device).

In some embodiments, the model may automatically perform actions based on outputs. In some embodiments, the model may not perform any actions. The output of the model may be used to determine whether to rotate and/or update authentication data and associated token data in order to prevent further misuse or fraud.

System 500 also includes API layer 550. API layer 550 may allow the system to generate summaries across different devices. In some embodiments, API layer 550 may be implemented on mobile device 522 or terminal 524. Alternatively or additionally, API layer 550 may reside on one or more of cloud components 510. API layer 550 (which may be A REST or Web services API layer) may provide a decoupled interface to data and/or functionality of one or more applications. API layer 550 may provide a common, language-agnostic way of interacting with an application. Web services APIs offer a well-defined contract, called WSDL, that describes the services in terms of its operations and the data types used to exchange information. REST APIs do not typically have this contract; instead, they are documented with client libraries for most common languages, including Ruby, Java, PHP, and JavaScript. SOAP Web services have traditionally been adopted in the enterprise for publishing internal services, as well as for exchanging information with partners in B2B transactions.

API layer 550 may use various architectural arrangements. For example, system 500 may be partially based on API layer 550, such that there is strong adoption of SOAP and RESTful Web services, using resources like Service Repository and Developer Portal, but with low governance, standardization, and separation of concerns. Alternatively, system 500 may be fully based on API layer 550, such that separation of concerns between layers like API layer 550, services, and applications are in place.

In some embodiments, the system architecture may use a microservice approach. Such systems may use two types of layers: Front-End Layer and Back-End Layer where microservices reside. In this kind of architecture, the role of the API layer 550 may provide integration between Front-End and Back-End. In such cases, API layer 550 may use RESTful APIs (exposition to front-end or even communication between microservices). API layer 550 may use AMQP (e.g., Kafka, RabbitMQ, etc.). API layer 550 may use incipient usage of new communications protocols such as gRPC, Thrift, etc.

In some embodiments, the system architecture may use an open API approach. In such cases, API layer 550 may use commercial or open-source API platforms and their modules. API layer 550 may use a developer portal. API layer 550 may use strong security constraints applying WAF and DDoS protection, and API layer 550 may use RESTful APIs as standard for external integration.

Figure 6:
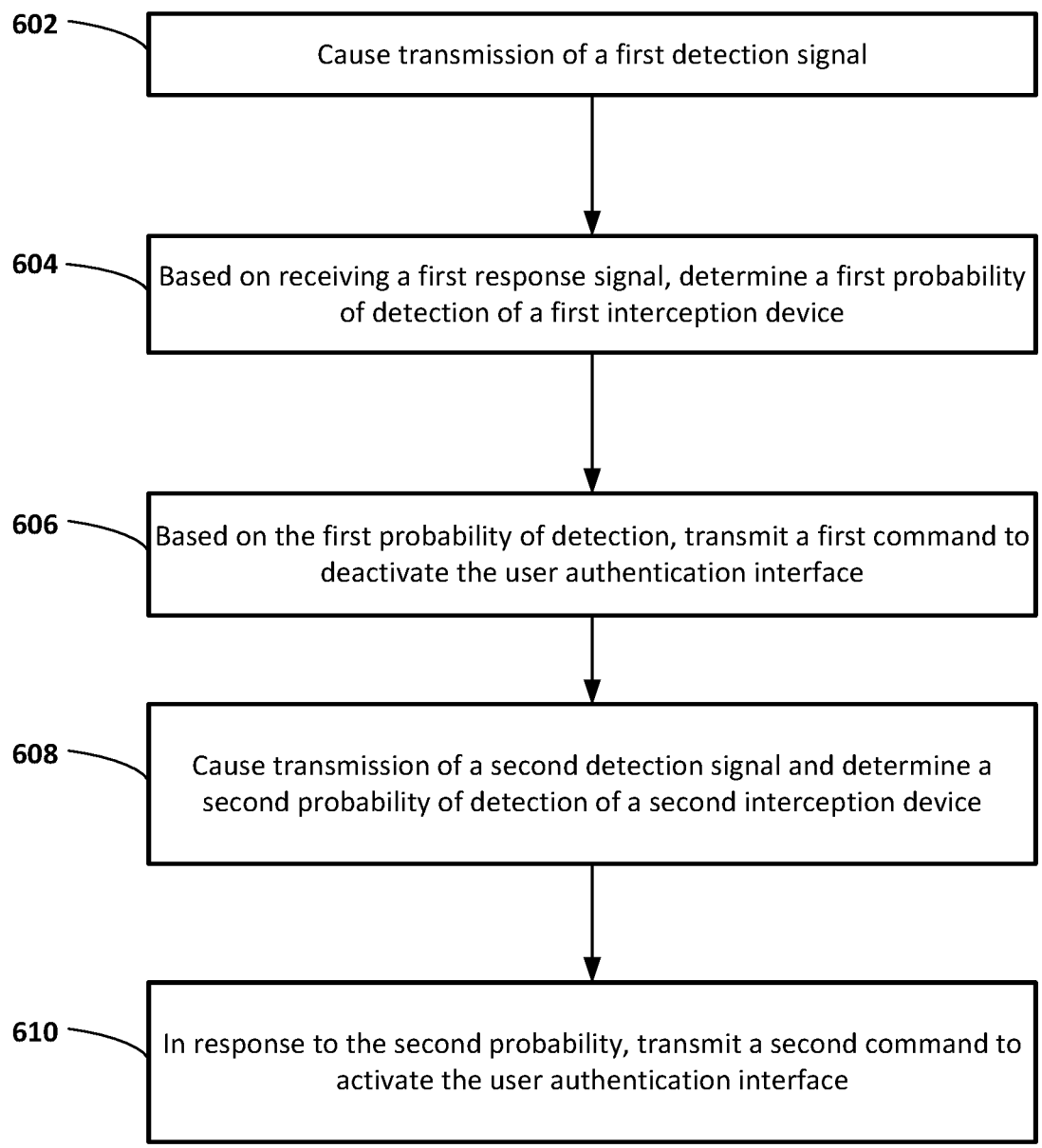
FIG. 6 shows an illustrative flowchart for a system for detecting credential interception devices, in accordance with one or more embodiments.

FIG. 6 shows an illustrative flowchart for a system for detecting credential interception devices, in accordance with one or more embodiments. For example, the system may use process 600 (e.g., as implemented on one or more system components described above) in order to adaptively detect credential interception devices in user token authentication devices, such as passport readers, while maintaining a low incidence of false positive readings and adapting to changes in interception technology.

At step 602, process 600 (e.g., using one or more components described above) enables system 400 to cause transmission of a first detection signal. For example, the system may cause transmission of a first detection signal for detecting presence of a credential interception device at a user authentication interface. In disclosed embodiments, the system can generate an RF signal of a collection of frequencies that are known to be associated with or interact with credential interception devices, such as account card skimmers. The system may utilize a transceiver, such as detection transceiver 464, to detect interception device 466, and transmit this information to processor(s) 414 within detection system 462 for further processing. In some embodiments, the system may utilize a transmitter to transmit the signal. By generating a detection signal, system 400 may probe the token authentication device for the inclusion of any malicious devices, such as credential interception devices, in order to protect users' data. In turn, interception devices may respond to such a detection signal (e.g., through electromagnetic induction and subsequent retransmission of a response signal), thereby enabling detection of foreign devices within the system.

In some embodiments, detection signals may include RF signals across a frequency range that is related to the operation of interception devices. For example, the first detection signal may include input RF signals corresponding to one or more input RF signals corresponding to a first frequency range associated with operation of interception devices. In disclosed embodiments, the system can choose a range of frequencies with which to probe the interception device using detection transceiver 464. For example, the system can tune the detection signal to focus on frequencies associated with operation of interception devices (e.g., Bluetooth signals associated with the interception devices for communication with external devices). Thus, the system may specify a range of frequencies with which to transmit the detection signal, in order to cause a response from the interception devices that is most likely to be detectable by the system. In some embodiments, the system may modify this range as more information is received, such as from a database of interception devices and associated frequencies of operation. By doing so, the system may adapt detection signals to novel interception devices or mechanisms, such that the system's accuracy may be maintained or improved over time.

At step 604, process 600 (e.g., using one or more components described above) enables system 400 to, based on receiving a first response signal, determine a first probability of detection of a first interception device. For example, based on receiving a first response signal in response to the first detection signal, the system can determine, according to first detection criteria, a first probability of detection of a first interception device at the user authentication interface. In disclosed embodiments, the system can store the response signal within memory 422 and utilize processor(s) 414 to determine the first probability of detection. Information regarding detection criteria, including software modules, algorithms, or hardware modules, may be stored within module database 412. The system can analyze the received response signal and determine the likelihood that the response signal corresponds to a credential interception device. For example, the system can analyze differences between the response signal and a baseline signal and determine whether these differences are indicative of any known interception devices, such as through a database. By analyzing the response signal and generating a probability of detection of an interception device, the system may improve the accuracy of detecting such devices, as well as quantify the likelihood of such a detection. Thus, the system can make more effective decisions based on this probability in order to reduce the incidence of false positive detections and subsequently reduce the impact on the system of such false positive detections on token authentication device uptime.

In some embodiments, the system may determine the probability of detection by determining a feature associated with the first response signal. For example, determining the first probability of detection of the first interception device may include determining a difference between the first response signal and a baseline signal for the user authentication interface. The system can determine that the difference between the first response signal and the baseline signal includes a first feature. The system can determine, based on the first feature, the probability of detection of the first interception device for the user authentication interface. For example, the system can determine differences between a received response signal and a baseline signal, where the baseline signal may indicate a normal, average, or expected response to the detection signal in the case of an absence of interception devices. By determining differences between the response signal and a baseline signal, the system may isolate components of the response signal that are anomalous (e.g., may correspond to a signal due to the presence of interception devices). These components may include features, such as peaks, dips, or irregularities in the response signal. By isolating these features, the system may determine whether these features may correspond to interception devices and, as such, may make more accurate determinations as to the probability of detection of interception devices.

In some embodiments, determining the first probability of detection of an interception device based on these isolated features may include determining a degree of similarity between the feature and a known signature that corresponds to interception devices. For example, the system may determine a similarity metric based on comparing the first feature with a first signature, wherein the first signature corresponds to a waveform characterizing the first interception device. The system, based on the similarity metric, can determine the first probability of detection of the first interception device. In disclosed embodiments, the system can compare a feature with a signature, such as a signal that has been known to be associated with an interception device (e.g., from a database or from historical data). This comparison may be quantified through, for example, finding an inner product between the two signals (e.g., by integrating the product of the feature and the signature over frequency space) and normalizing the product. By doing so, the system may generate a similarity metric, which may be used to determine a probability of detection of the first interception device. By doing so, the system may leverage past data and clues regarding interception devices and accurately identify such data in newly received signals. Thus, the system may improve determinations of the presence of interception devices and, for example, reduce false positive results if a feature does not match an interception device's signature well.

In some embodiments, the system may determine a probability of detection of an interception device based on matching a feature of the response signal with a device identifier on a known list of interception device identifiers. For example, the system may determine a first feature associated with the first response signal. The system may extract, from the first feature, a first device identifier. The system may retrieve a plurality of interception device identifiers from a database of interception device identifiers. Based on determining a match between the first device identifier and an interception device identifier from the plurality of interception device identifiers, the system may determine that the first device identifier corresponds to the first interception device. The system may determine the first probability of detection of the first interception device based on the match. For example, the system may determine that the response signal includes a device identifier, such as a MAC number, an IP number, or another identifier of a device, based on a feature of the response signal (e.g., by identifying and parsing a Bluetooth signal within the response signal). The system can look up the device identifier on a database of device identifiers that are known to correspond to interception devices. By doing so, the system may more accurately determine a probability of an interception device being present in the system, based on device identifiers within the response signal.

At step 606, process 600 (e.g., using one or more components described above) enables system 400 to, based on the first probability of detection, transmit a first command to deactivate the user authentication interface. For example, based on determining that the first probability is greater than a threshold, the system may transmit a first command to deactivate the user authentication interface. In disclosed embodiments, detection system 462 may communicate the command to deactivate user authentication interface 402 through authentication device interface 454 and detection system interface 442. The system can compare the probability calculated based on the response signal to a threshold probability. In some embodiments, the threshold probability can vary based on detection criteria, the type of interception device detected, and/or specific information or history corresponding to the token authentication device. Upon determining that the probability is greater than the threshold, the system can send a command to the user authentication interface to stop accepting user tokens and/or carry out authentication tasks, or to deactivate in any other manner. In this manner, the system can prevent security breaches or theft of credential information from user tokens upon determining that there is a reasonable likelihood of the presence of one or more interception devices. By comparing the probability of detection of an interception device with a threshold, the system may improve its handling of false positive detection results by, for example, taking no action upon determining that the probability of detection is lower than the threshold. Alternatively or additionally, the system can tune the threshold to be at a greater value to provide better sensitivity to interception devices. Thus, the system can better mitigate risks of credential interception.

At step 608, process 600 (e.g., using one or more components described above) enables computing system 400 to cause transmission of a second detection signal and determine a second probability of detection of a second interception device. For example, the system may, at a subsequent time, cause transmission of a second detection signal and, based on receiving a second response signal in response to the second detection signal, determine according to second detection criteria a second probability of detection of a second interception device at the user authentication interface, wherein the second detection criteria is distinct from the first detection criteria. In disclosed embodiments, the system may wait a configurable amount of time (e.g., based on detection criteria stored within module database 412) before sending another detection signal (e.g., through detection transceiver 464) to probe for the presence of an interception device. In some embodiments, the system may transmit the second detection signal and analyze the response signal for the same interception device using different detection criteria, such as using different software modules or a different transmitter. Alternatively or additionally, the system may probe for a second interception device (e.g., of a different type or version than the first one) using the second detection criteria. As an illustrative example, the system may receive a second response signal that does not seem similar to the first response signal and, in response, choose a different software module to analyze the signal. In response, the system may determine a second probability of detection of a second interception device (e.g., or, in some embodiments, a second mechanism of interception by the first interception device, such as a new range of operating frequencies). By doing so, the system may adapt to changes in interception mechanisms by malicious entities, thereby improving the system's effectiveness in mitigating the theft of credential information. Additionally, by waiting a period of time till a subsequent time (e.g., the configurable period of time) to execute this second detection process, the system may improve the chances of false positive results by screening out the effects of any transient response signals that might be expected to disappear following the period of time.

In some embodiments, the system may modify the configurable time period based on the second probability of detection. For example, in response to determining that the second probability is less than the threshold, the system may determine a new value for the configurable time period. After the configurable time period has elapsed, the system may cause transmission of a third detection signal. In some embodiments, the system may modify the configurable time period based on a probability difference. For example, the system may determine a probability difference between the first probability of detection and the second probability of detection. For example, the system may determine, after the second response signal was received, that the second response signal indicates that the first response signal did not likely correspond to an interception device. For example, the feature found within the first response signal may have vanished for the second response signal, indicating that the feature likely corresponded to a transient signal rather than an interception device (i.e., that the first detection event based on the first response signal was a false positive). Upon this determination, the system may determine that the configurable time period may be reduced, such that if another similar transient event were to occur, the system may reduce the time required to re-probe and, therefore, may reduce the deactivation time of the user authentication interface. By doing so, the system may reduce the impact of false positive results on the operation of the token authentication device, and improve its up-time in such situations.

In some embodiments, the system may determine a module to add to detection criteria in order to improve its accuracy based on the second response signal and second probability of detection. For example, based on the second response signal and the second probability of detection, the system may determine a module, wherein the module is configured to analyze response signals. The system may modify the second detection criteria to include the module. For example, the system may determine, based on the second response signal, that the first response signal in reality did not correspond to an interception device. For example, the system may determine that the first response signal, while exhibiting a feature similar to a signature of a known interception device, was likely a transient feature as it was missing from the second response signal. Thus, the system may modify the first detection criteria by adding a module (e.g., software, a patch, or an algorithm). The module may, upon encountering signals similar to the transient feature, may modify the calculated probability of detection of the first interception device to be less than the threshold, such that such false positives are not detected in the future. By doing so, the system may learn from subsequent response signals and, thus, reduce the incidence of false positives within the system when a similar signal is received in the future.

In some embodiments, the system may determine a deactivation time and compare this deactivation time with the configurable time period before transmitting the second detection signal. For example, the system may determine a deactivation time based on a time difference between a first timestamp associated with the first detection signal and a second timestamp associated with the second detection signal. The system may determine that the deactivation time is greater than a configurable time period. Based on determining that the deactivation time is greater than the configurable time period, the system may cause transmission of the second detection signal. The system may, for example, determine an elapsed time for which the user authentication interface has been deactivated due to the first command, based on when the corresponding detection signals were transmitted. Thus, the system may determine whether enough time has passed such that the deactivation time is greater than the configurable period of time, and only determine to send the second detection signal when this is true. By doing so, the system enables detection of false positive results, by ensuring that when a transient signal is encountered (e.g., when an interception device is not found again after waiting for the configurable time period), the system is re-activated. If the configurable time period is too low, the system may determine that a transient signal is likely to be an interception device and needlessly extend the deactivation time of the user authentication interface. On the other hand, if the configurable time period is too high, false positive results may not be caught in time for reactivation, leading to long deactivation times as well. Thus, by ensuring that the second detection signal is transmitted only after a configurable time period, the system may improve its false positive detection handling and, consequently, reduce system down-time.

At step 610, process 600 (e.g., using one or more components described above) enables computing system 400 to, in response to the second probability, transmit a second command to activate the user authentication interface. For example, in response to determining that the second probability is lower than the threshold, the system may transmit a second command to activate the user authentication interface. The system may determine that the second response signal does not indicate a sufficient likelihood of the presence of an interception device, such as if the first response signal was due to a transient device mistaken to be an interception device. Thus, upon receiving the second response signal, the system may reactivate the system, having determined that the first response signal may have been a false positive result. By doing so, the system may maintain a longer up-time for the token authentication device, thereby improving its resilience to false-positive results. In some embodiments, such as in the case of detecting a second response signal that likely corresponds to a second interception device, the system may, instead, cause transmission of a second command to maintain deactivation of the user authentication interface. In this case, the system may determine that the risk of re-activating the user authentication interface is high, as an interception device is likely still present, even if its nature has changed. Thus, the system may detect adaptive or dynamic interception devices whose responses may differ over time and protect users against credential theft in these circumstances.

In some embodiments, the system may train a machine learning model to determine probabilities of detection based on received response signals and confirmation validations of the presence of interception devices. For example, the system may receive, from a user device, a validation confirmation, wherein the validation confirmation indicates an indication of a presence of one or more interception devices for the user authentication interface. The system may train a machine learning model for predicting probabilities of detection, based on training data comprising the first probability of detection, the second probability of detection, the indication of the presence of the one or more interception devices, the first response signal, and the second response signal. The system may generate a module comprising the machine learning model and may modify the first detection criteria to include the module. For example, the system may receive the first and second response signals and, additionally or alternatively, may receive information regarding whether an interception device has been confirmed to be present (e.g., a validation confirmation), which may be done manually. The system may train a machine learning model based on this validation confirmation, as well as the response signals input into the machine learning model. By doing so, the system may learn from previous information regarding response signals and whether they actually correspond to interception devices, thereby enabling adaptation to new interception devices and technologies over time. By incorporating the machine learning model into the first detection criteria, the system may improve detection of interception devices at earlier stages. Conversely, the system may be more capable of detecting false positive results based on a machine learning model that was trained on false positive results, thereby improving the system's handling of such errors and increasing the up-time of the user authentication interface subsequently.

In some embodiments, the system may transmit an activation command based on the second probability of detection. For example, the system, based on determining that the second probability of detection is less than the threshold, may transmit an activation command to the user authentication interface, wherein the activation command enables credential verification by the user authentication interface. In some embodiments, the system may determine that, upon receiving the second response signal, it is unlikely that the first response signal corresponded to an interception device. In response, the system may determine to enable credential verification once again by the user authentication interface through the activation command, thereby reducing any downtime due to the false positive detection.

In some embodiments, the system may transmit a third detection signal after the configurable time period if the second probability of detection is greater than the threshold. For example, the system may determine that the second probability of detection is greater than the threshold. The system may transmit a third detection signal at a third time corresponding to a third timestamp, wherein a time difference between a first timestamp and the third timestamp is greater than a configurable time period, and wherein the first timestamp is associated with a receipt time for the first response signal. For example, the system may determine, after the first and second response signals, that the respective signals were not due to a transient device or object, such as a set of user car keys. However, the system may continue to probe as to the continued presence of the interception device, in order to adapt to any changes in the interception device. For example, a malicious actor may change the frequency of operation of the interception device over time. Thus, the system may continue to send out further detection signals in order to further respond to the presumptive interception device, as well as to further monitor for false positive detection events.

In some embodiments, the system may transmit a deactivation command based on the second probability of detection. For example, based on determining that the second probability of detection of the second interception device is greater than the threshold, the system may transmit a second deactivation command to the user authentication interface, wherein the second deactivation command causes the user authentication interface to reject credential authentication requests. For example, having determined that there is a high likelihood of the presence of an interception device within the system, the system may determine to deactivate the user authentication interface (or maintain deactivation of the authentication interface), in order to mitigate the theft of credential information on user tokens. By doing so, the system may continue to protect against credential theft if the likelihood of the presence of interception devices continues to be high.

In some embodiments, the system may modify the detection signal to include a different frequency range. For example, the system may determine a second frequency range corresponding to the second response signal for the user authentication interface. The system may transmit a third detection signal for the user authentication interface, wherein the third detection signal comprises one or more input RF signals corresponding to a third frequency range, and wherein the third frequency range includes the first frequency range and the second frequency range. In some embodiments, the system may learn frequencies at which interception devices may be sensitive or detectable (e.g., through measurement or analysis of the response signals). The system may, subsequently, modify detection signals to include such sensitive frequencies in order to improve the detection capabilities of the system for interception devices.

In some embodiments, the system may transmit a request to confirm the validity of the determination of the presence of interception devices. For example, based on determining that the second probability of detection of the second interception device is greater than the threshold, the system may transmit a request for validation confirmation to a user device, wherein the request for validation confirmation comprises the first probability of detection, the second probability of detection, a first timestamp associated with a receipt time for the first response signal, and a second timestamp associated with a receipt time for the second response signal. For example, the system may send a message to a system administrator to check for the presence of interception devices. In some embodiments, this message may include information regarding the response signals received and the probabilities of detection of relevant interception devices. Based on this information, the system administrator may determine whether the system made accurate assessments of the presence of interception devices. In some embodiments, based on this request, the system may receive such validation confirmation and learn from such information accordingly in order to improve subsequent determinations of the probabilities of detection.

It is contemplated that the steps or descriptions of FIG. 6 may be used with any other embodiment of this disclosure. In addition, the steps and descriptions described in relation to FIG. 6 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 6.

The above-described embodiments of the present disclosure are presented for purposes of illustration and not of limitation, and the present disclosure is limited only by the claims which follow. Furthermore, it should be noted that the features and limitations described in any one embodiment may be applied to any embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method for detecting a credential interception device at a user authentication interface, the method comprising: causing transmission of a first detection signal for detecting presence of a credential interception device at a user authentication interface, wherein the first detection signal comprises one or more input radio frequency (RF) signals corresponding to a frequency range associated with operation of credential interception devices; based on receiving a first response signal in response to the first detection signal, determining, using a first software module, a first probability of detection of a first interception device at the user authentication interface, wherein the first response signal comprises a first waveform signature corresponding to the first interception device, wherein the first software module is configured to analyze the first waveform signature; in response to determining that the first probability is greater than a threshold, transmitting a first command to deactivate the user authentication interface; after a configurable time period has elapsed, causing transmission of a second detection signal and based on receiving a second response signal in response to the second detection signal, determining, using the first software module, the second response signal includes a second waveform signature distinct from the first waveform signature; determining, using a second software module, a second probability of detection of a second interception device distinct from the first interception device, wherein the second software module is configured to analyze the second waveform signature; and in response to determining that the second probability is greater than the threshold, transmitting a second command to maintain deactivation of the user authentication interface.

2. A method for detecting a credential interception device at a user authentication interface, the method comprising: causing transmission of a first detection signal for detecting presence of a credential interception device at a user authentication interface; based on receiving a first response signal in response to the first detection signal, determining according to first detection criteria a first probability of detection of a first interception device at the user authentication interface; based on determining that the first probability is greater than a threshold, transmitting a first command to deactivate the user authentication interface; at a subsequent time, causing transmission of a second detection signal and based on receiving a second response signal in response to the second detection signal, determining according to second detection criteria a second probability of detection of a second interception device at the user authentication interface, wherein the second detection criteria is distinct from the first detection criteria; and in response to determining that the second probability is lower than the threshold, transmitting a second command to activate the user authentication interface.

3. A method, the method comprising: causing transmission of a first detection signal for detecting presence of a credential interception device at a user authentication interface; based on receiving a first response signal in response to the first detection signal, determining a first software module, wherein the first software module is configured to analyze a first waveform signature associated with the first response signal; determining, according to the first software module, a first probability of detection of a first interception device at the user authentication interface; based on determining that the first probability is greater than a threshold, transmitting a first command to deactivate the user authentication interface; at a subsequent time, causing transmission of a second detection signal and based on receiving a second response signal in response to the second detection signal, determining a second software module, wherein the second software module is configured to analyze a second waveform signature associated with the second response signal; determining, according to the second software module, a second probability of detection of a second interception device at the user authentication interface; and in response to determining that the second probability is greater than the threshold, transmitting a second command to maintain deactivation of the user authentication interface.

4. The method of any one of the preceding embodiments, further comprising: in response to determining that the second probability is less than the threshold, determining a new value for the configurable time period; and after the configurable time period has elapsed, causing transmission of a third detection signal.

5. The method of any one of the preceding embodiments, wherein determining according to the first detection criteria the first probability of detection of the first interception device for the user authentication interface comprises: based on the first response signal, determining a first module from a plurality of modules, wherein the first module is configured to analyze response signals; and determining, using the first module, the first probability of detection of the first interception device for the user authentication interface.

6. The method of any one of the preceding embodiments, further comprising:
based on the second response signal and the second probability of detection, determining a module, wherein the module is configured to analyze response signals; and modifying the first detection criteria to include the module.

7. The method of any one of the preceding embodiments, further comprising: receiving, from a user device, a validation confirmation, wherein the validation confirmation indicates a indication of a presence of one or more interception devices for the user authentication interface; training a machine learning model for predicting probabilities of detection, based on training data comprising the first probability of detection, the second probability of detection, the indication of the presence of the one or more interception devices, the first response signal, and the second response signal; generating a module comprising the machine learning model; and modifying the first detection criteria to include the module.

8. The method of any one of the preceding embodiments, wherein, at the subsequent time, causing the transmission of the second detection signal comprises: determining a deactivation time based on a time difference between a first timestamp associated with the first detection signal and a second timestamp associated with the second detection signal; determining that the deactivation time is greater than a configurable time period; and based on determining that the deactivation time is greater than the configurable time period, causing transmission of the second detection signal.
9. The method of any one of the preceding embodiments, further comprising: based on determining that the second probability of detection is less than the threshold, transmitting an activation command to the user authentication interface, wherein the activation command enables credential verification by the user authentication interface.
10. The method of any one of the preceding embodiments, further comprising: determining a probability difference between the first probability of detection and the second probability of detection; and based on determining that the probability difference is greater than a threshold probability difference, modifying the configurable time period.
11. The method of any one of the preceding embodiments, further comprising: determining that the second probability of detection is greater than the threshold; and transmitting a third detection signal at a third time corresponding to a third timestamp, wherein a time difference between a first timestamp and the third timestamp is greater than a configurable time period, and wherein the first timestamp is associated with a receipt time for the first response signal.
12. The method of any one of the preceding embodiments, wherein determining the first probability of detection of the first interception device comprises: determining a difference between the first response signal and a baseline signal for the user authentication interface; determining that the difference between the first response signal and the baseline signal includes a first feature; and determining, based on the first feature, the first probability of detection of the first interception device for the user authentication interface.
13. The method of any one of the preceding embodiments, wherein determining, based on the first feature, the first probability of detection of the first interception device comprises: determining a similarity metric based on comparing the first feature with a first signature, wherein the first signature corresponds to a waveform characterizing the first interception device; and based on the similarity metric, determining the first probability of detection of the first interception device.
14. The method of any one of the preceding embodiments, further comprising: based on determining that the second probability of detection of the second interception device is greater than the threshold, transmitting a second deactivation command to the user authentication interface, wherein the second deactivation command causes the user authentication interface to reject credential authentication requests.
15. The method of any one of the preceding embodiments, wherein the first detection signal comprises input radiofrequency (RF) signals corresponding to one or more input radiofrequency (RF) signals corresponding to a first frequency range associated with operation of interception devices.
16. The method of any one of the preceding embodiments, further comprising: determining a second frequency range corresponding to the second response signal for the user authentication interface; and transmitting a third detection signal for the user authentication interface, wherein the third detection signal comprises one or more input radiofrequency signals corresponding to a third frequency range, and wherein the third frequency range includes the first frequency range and the second frequency range.
17. The method of any one of the preceding embodiments, wherein determining the first probability of detection of the first interception device comprises: determining a first feature associated with the first response signal; extracting, from the first feature, a first device identifier; retrieving a plurality of interception device identifiers from a database of interception device identifiers; based on determining a match between the first device identifier and an interception device identifier from the plurality of interception device identifiers, determining that the first device identifier corresponds to the first interception device; and determining the first probability of detection of the first interception device based on the match.
18. The method of any one of the preceding embodiments, further comprising: based on determining that the second probability of detection of the second interception device is greater than the threshold, transmitting a request for validation confirmation to a user device, wherein the request for validation confirmation comprises the first probability of detection, the second probability of detection, a first timestamp associated with a receipt time for the first response signal, and a second timestamp associated with a receipt time for the second response signal.
19. A tangible, non-transitory, machine-readable medium storing instructions that, when executed by a data processing apparatus, cause the data processing apparatus to perform operations comprising those of any of embodiments 1-18.
20. A system comprising one or more processors; and memory storing instructions that, when executed by the processors, cause the processors to effectuate operations comprising those of any of embodiments 1-18.
21. A system comprising means for performing any of embodiments 1-18.
22. A system comprising cloud-based circuitry for performing any of embodiments 1-18.

What is claimed is:

1. A system for detecting a credential interception device at a user authentication interface, the system comprising:
one or more processors; and
one or more non-transitory, computer-readable media storing instructions that, when executed by the one or more processors, cause operations comprising:
causing transmission of a first detection signal for detecting presence of a credential interception device at a user authentication interface, wherein the first detection signal comprises one or more input radio frequency (RF) signals corresponding to a frequency range associated with operation of credential interception devices;
based on receiving a first response signal in response to the first detection signal, determining, using a first software module, a first probability of detection of a first interception device at the user authentication interface, wherein the first response signal comprises a first waveform signature corresponding to the first interception device, wherein the first software module is configured to analyze the first waveform signature;
in response to determining that the first probability is greater than a threshold, transmitting a first command to deactivate the user authentication interface;

after a configurable time period has elapsed, causing transmission of a second detection signal and based on receiving a second response signal in response to the second detection signal, determining, using the first software module, the second response signal includes a second waveform signature distinct from the first waveform signature;

determining, using a second software module, a second probability of detection of a second interception device distinct from the first interception device, wherein the second software module is configured to analyze the second waveform signature; and in response to determining that the second probability is greater than the threshold, transmitting a second command to maintain deactivation of the user authentication interface.

2. The system of claim 1, further comprising:
in response to determining that the second probability is less than the threshold, determining a new value for the configurable time period; and
after the configurable time period has elapsed, causing transmission of a third detection signal.

3. A method for detecting a credential interception device at a user authentication interface, the method comprising:
causing transmission of a first detection signal for detecting presence of a credential interception device at a user authentication interface;
based on receiving a first response signal in response to the first detection signal, determining according to first detection criteria a first probability of detection of a first interception device at the user authentication interface;
based on determining that the first probability is greater than a threshold, transmitting a first command to deactivate the user authentication interface;
at a subsequent time, causing transmission of a second detection signal and based on receiving a second response signal in response to the second detection signal, determining according to second detection criteria a second probability of detection of a second interception device at the user authentication interface, wherein the second detection criteria is distinct from the first detection criteria;
determining that the second probability of detection is greater than the threshold; and
transmitting a third detection signal at a third time corresponding to a third timestamp, wherein a time difference between a first timestamp and the third timestamp is greater than a configurable time period, and wherein the first timestamp is associated with a receipt time for the first response signal.

4. The method of claim 3, wherein determining according to the first detection criteria the first probability of detection of the first interception device for the user authentication interface comprises:
based on the first response signal, determining a first module from a plurality of modules, wherein the first module is configured to analyze response signals; and
determining, using the first module, the first probability of detection of the first interception device for the user authentication interface.

5. The method of claim 3, further comprising:
based on the second response signal and the second probability of detection, determining a module, wherein the module is configured to analyze response signals; and modifying the first detection criteria to include the module.

6. The method of claim 3, further comprising:
receiving, from a user device, a validation confirmation, wherein the validation confirmation indicates an indication of a presence of one or more interception devices for the user authentication interface;
training a machine learning model for predicting probabilities of detection, based on training data comprising the first probability of detection, the second probability of detection, the indication of the presence of the one or more interception devices, the first response signal, and the second response signal;
generating a module comprising the machine learning model; and
modifying the first detection criteria to include the module.

7. The method of claim 3, wherein, at the subsequent time, causing the transmission of the second detection signal comprises:
determining a deactivation time based on a time difference between the first timestamp associated with the first detection signal and a second timestamp associated with the second detection signal;
determining that the deactivation time is greater than the configurable time period; and
based on determining that the deactivation time is greater than the configurable time period, causing transmission of the second detection signal.

8. The method of claim 7, further comprising:
based on determining that the second probability of detection is less than the threshold, transmitting an activation command to the user authentication interface, wherein the activation command enables credential verification by the user authentication interface.

9. The method of claim 7, further comprising:
determining a probability difference between the first probability of detection and the second probability of detection; and
based on determining that the probability difference is greater than a threshold probability difference, modifying the configurable time period.

10. The method of claim 3, wherein determining the first probability of detection of the first interception device comprises:
determining a difference between the first response signal and a baseline signal for the user authentication interface;
determining that the difference between the first response signal and the baseline signal includes a first feature; and
determining, based on the first feature, the first probability of detection of the first interception device for the user authentication interface.

11. The method of claim 10, wherein determining, based on the first feature, the first probability of detection of the first interception device comprises:
determining a similarity metric based on comparing the first feature with a first signature, wherein the first signature corresponds to a waveform characterizing the first interception device; and
based on the similarity metric, determining the first probability of detection of the first interception device.

12. The method of claim 3, further comprising:
based on determining that the second probability of detection of the second interception device is greater than the threshold, transmitting a second deactivation command to the user authentication interface, wherein the second deactivation command causes the user authentication interface to reject credential authentication requests.

13. The method of claim 3, wherein the first detection signal comprises input radiofrequency (RF) signals corresponding to one or more input radiofrequency (RF) signals corresponding to a first frequency range associated with operation of interception devices.

14. The method of claim 13, further comprising:
determining a second frequency range corresponding to the second response signal for the user authentication interface; and
transmitting the third detection signal for the user authentication interface, wherein the third detection signal comprises one or more input radiofrequency signals corresponding to a third frequency range, and wherein the third frequency range includes the first frequency range and the second frequency range.

15. The method of claim 3, wherein determining the first probability of detection of the first interception device comprises:
determining a first feature associated with the first response signal;
extracting, from the first feature, a first device identifier;
retrieving a plurality of interception device identifiers from a database of interception device identifiers;
based on determining a match between the first device identifier and an interception device identifier from the plurality of interception device identifiers, determining that the first device identifier corresponds to the first interception device; and
determining the first probability of detection of the first interception device based on the match.

16. The method of claim 3, further comprising:
based on determining that the second probability of detection of the second interception device is greater than the threshold, transmitting a request for validation confirmation to a user device, wherein the request for validation confirmation comprises the first probability of detection, the second probability of detection, the first timestamp associated with the receipt time for the first response signal, and a second timestamp associated with a receipt time for the second response signal.

17. One or more non-transitory, computer-readable media comprising instructions that, when executed by one or more processors, cause operations comprising:

causing transmission of a first detection signal for detecting presence of a credential interception device at a user authentication interface;
based on receiving a first response signal in response to the first detection signal, determining a first software module, wherein the first software module is configured to analyze a first waveform signature associated with the first response signal;
determining, according to the first software module, a first probability of detection of a first interception device at the user authentication interface;
based on determining that the first probability is greater than a threshold, transmitting a first command to deactivate the user authentication interface;
at a subsequent time, causing transmission of a second detection signal and based on receiving a second response signal in response to the second detection signal, determining a second software module, wherein the second software module is configured to analyze a second waveform signature associated with the second response signal;
determining, according to the second software module, a second probability of detection of a second interception device at the user authentication interface;
in response to determining that the second probability is greater than the threshold, transmitting a second command to maintain deactivation of the user authentication interface;
determining a deactivation time based on a time difference between a first timestamp associated with a receipt time for the first detection signal and a second timestamp associated with a receipt time for the second detection signal;
determining that the deactivation time is greater than a configurable time period; and
based on determining that the deactivation time is greater than the configurable time period, causing transmission of the second detection signal.

18. The one or more non-transitory, computer-readable media of claim 17, wherein the instructions cause operations further comprising:
based on determining that the second probability of detection is less than the threshold, transmitting an activation command to the user authentication interface, wherein the activation command enables credential verification by the user authentication interface.

* * * * *